US011372938B1

(12) United States Patent
Stoddard et al.

(10) Patent No.: US 11,372,938 B1
(45) Date of Patent: *Jun. 28, 2022

(54) SYSTEM AND METHOD FOR PERFORMING SEARCH REQUESTS IN A NETWORK

(71) Applicant: Tanium Inc., Emeryville, CA (US)

(72) Inventors: Joshua F. Stoddard, Cary, NC (US); Sachin P. Patel, Cary, NC (US); Shawn M. Surber, Meridian, ID (US); Aaron J. Tarter, Chapel Hill, NC (US); John R. Coates, Berkeley, CA (US)

(73) Assignee: TANIUM INC., Kirkland, WA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/870,742

(22) Filed: May 8, 2020

Related U.S. Application Data

(63) Continuation-in-part of application No. 16/532,391, filed on Aug. 5, 2019, now Pat. No. 10,929,345, (Continued)

(51) Int. Cl.
G06F 16/953 (2019.01)
H04L 9/40 (2022.01)
(Continued)

(52) U.S. Cl.
CPC .......... *G06F 16/953* (2019.01); *G06F 16/148* (2019.01); *G06F 16/156* (2019.01);
(Continued)

(58) Field of Classification Search
CPC ....... H04L 43/08; H04L 43/00; H04L 43/062; H04L 43/10; H04L 41/0893; H04L 41/12;
(Continued)

(56) References Cited

U.S. PATENT DOCUMENTS 5,220,596 A 6/1993 Patel
5,842,202 A 11/1998 Kon
(Continued)

FOREIGN PATENT DOCUMENTS

EP 1553747 A1 7/2005
EP 2493118 A1 8/2012

OTHER PUBLICATIONS

Abdalkarim Awad et al., Virtual Cord Protocol (VCP): A Flexible DHT-like Routing Service for Sensor Networks, In Proceedings of the 5th IEEE International Conference on Mobile Ad Hoc and Sensor Systems, 2008, 10 pgs. 133-142.
(Continued)

*Primary Examiner* — Tae K Kim
(74) *Attorney, Agent, or Firm* — Morgan, Lewis & Bockius LLP

(57) ABSTRACT

A machine in a linear communication orbit receives a query, including a set of one or more rules, through the linear communication orbit. The machine, for each respective rule: identifies files that contain content that satisfies the respective rule, generates a first report identifying a count of files at the machine that contain content satisfying the rule, and sends the first report through the linear communication orbit to a server. The machine receives an instruction packet from an external machine that includes an instruction for establishing a direct duplex connection between the respective machine and the external machine. then sends a request to the external machine to establish the direct duplex connection. The machine sends to the external machine, via the direct duplex connection, a second report including information identifying files at the machine that contain file content satisfying each rule in the set of one or more rules.

34 Claims, 11 Drawing Sheets

Related U.S. Application Data which is a continuation-in-part of application No. 15/215,474, filed on Jul. 20, 2016, now Pat. No. 10,482,242, and a continuation-in-part of application No. 15/215,468, filed on Jul. 20, 2016, now Pat. No. 10,372,904.

(60) Provisional application No. 62/845,827, filed on May 9, 2019, provisional application No. 62/333,768, filed on May 9, 2016, provisional application No. 62/305,482, filed on Mar. 8, 2016.

(51) Int. Cl.
| | | |
|---|---|---|
| *H04L 9/06* | (2006.01) | |
| *H04L 5/14* | (2006.01) | |
| *G06F 16/14* | (2019.01) | |
| *H04L 43/08* | (2022.01) | |
| *G06F 16/2455* | (2019.01) | |

(52) U.S. Cl.
CPC .......... *G06F 16/24564* (2019.01); *H04L 5/14* (2013.01); *H04L 9/0643* (2013.01); *H04L 43/08* (2013.01); *H04L 63/0428* (2013.01)

(58) Field of Classification Search
CPC ............. H04L 41/0813; H04L 41/0869; H04L 67/2842; H04L 67/2885; H04L 67/104; H04L 67/1042; H04L 67/1061; H04L 67/1063
See application file for complete search history.

(56) References Cited

U.S. PATENT DOCUMENTS

| | | | |
|---|---|---|---|
| 5,949,755 | A | 9/1999 | Uphadya et al. |
| 6,049,828 | A | 4/2000 | Dev et al. |
| 6,615,213 | B1 | 9/2003 | Johnson |
| 6,879,979 | B2 | 4/2005 | Hindawi et al. |
| 6,885,644 | B1 | 4/2005 | Knop et al. |
| 6,959,000 | B1 | 10/2005 | Lee et al. |
| 7,043,550 | B2 | 5/2006 | Knop et al. |
| 7,120,693 | B2 | 10/2006 | Chang et al. |
| 7,225,243 | B1 | 5/2007 | Wilson |
| 7,240,044 | B2 | 7/2007 | Chaudhuri et al. |
| 7,299,047 | B2 | 11/2007 | Dolan et al. |
| 7,555,545 | B2 | 6/2009 | McCasland |
| 7,600,018 | B2 | 10/2009 | Maekawa et al. |
| 7,698,453 | B2 | 4/2010 | Samuels et al. |
| 7,720,641 | B2 | 5/2010 | Alagappan et al. |
| 7,761,557 | B2 | 7/2010 | Fellenstein et al. |
| 7,769,848 | B2 | 8/2010 | Choy et al. |
| 7,844,687 | B1 | 11/2010 | Gelvin et al. |
| 8,078,668 | B2 | 12/2011 | Moreau |
| 8,086,729 | B1 | 12/2011 | Hindawi et al. |
| 8,139,508 | B1 | 3/2012 | Roskind |
| 8,185,612 | B1 | 5/2012 | Arolovitch et al. |
| 8,185,615 | B1 | 5/2012 | McDysan et al. |
| 8,271,522 | B2 | 9/2012 | Mehul et al. |
| 8,392,530 | B1 | 3/2013 | Manapragada et al. |
| 8,477,660 | B2 | 7/2013 | Lee et al. |
| 8,504,879 | B2 | 8/2013 | Poletto et al. |
| 8,510,562 | B2 | 8/2013 | Ramakrishnan et al. |
| 8,813,228 | B2 | 8/2014 | Magee et al. |
| 8,885,521 | B2 | 11/2014 | Wang et al. |
| 8,903,973 | B1 * | 12/2014 | Hindawi ................. H04L 41/12 709/217 |
| 8,904,039 | B1 * | 12/2014 | Hindawi ............. H04L 12/6418 709/217 |
| 9,009,827 | B1 | 4/2015 | Albertson et al. |
| 9,059,961 | B2 * | 6/2015 | Hindawi ............. H04L 67/1072 |
| 9,246,977 | B2 | 1/2016 | Hindawi et al. |
| 9,609,007 | B1 | 3/2017 | Rivlin et al. |
| 9,667,738 | B2 * | 5/2017 | Hindawi ................. H04L 67/32 |
| 9,716,649 | B2 | 7/2017 | Bent et al. |
| 9,769,037 | B2 * | 9/2017 | Hindawi ............... H04L 41/044 |
| 9,800,603 | B1 | 10/2017 | Sidagni et al. |
| 9,985,982 | B1 | 5/2018 | Bartos et al. |
| 10,095,864 | B2 * | 10/2018 | Hunt ................... H04L 63/1425 |
| 10,136,415 | B2 | 11/2018 | Hindawi et al. |
| 10,261,770 | B2 | 4/2019 | Devagupthapu et al. |
| 10,482,242 | B2 * | 11/2019 | Hunt ................... H04L 41/0893 |
| 10,498,744 | B2 * | 12/2019 | Hunt ..................... H04L 67/141 |
| 10,795,906 | B1 | 10/2020 | Teubner |
| 10,824,729 | B2 * | 11/2020 | Hoscheit ............ G06F 11/3006 |
| 10,929,345 | B2 * | 2/2021 | Stoddard ............... G06F 16/152 |
| 11,153,383 | B2 * | 10/2021 | Richards ............... G06F 16/252 |
| 2001/0056461 | A1 | 12/2001 | Kampe et al. |
| 2002/0007404 | A1 | 1/2002 | Vange et al. |
| 2002/0042693 | A1 | 4/2002 | Kampe et al. |
| 2002/0073086 | A1 | 6/2002 | Thompson et al. |
| 2002/0198867 | A1 | 12/2002 | Lohman et al. |
| 2003/0101253 | A1 | 5/2003 | Saito et al. |
| 2003/0131044 | A1 | 7/2003 | Nagendra et al. |
| 2003/0212676 | A1 | 11/2003 | Bruce et al. |
| 2003/0212821 | A1 | 11/2003 | Gillies et al. |
| 2004/0076164 | A1 | 4/2004 | Vanderveen et al. |
| 2004/0190085 | A1 | 9/2004 | Silverbrook et al. |
| 2005/0004907 | A1 | 1/2005 | Bruno et al. |
| 2005/0108356 | A1 | 5/2005 | Rosu et al. |
| 2005/0108389 | A1 | 5/2005 | Kempin et al. |
| 2005/0195755 | A1 * | 9/2005 | Senta .................... H04L 12/185 370/255 |
| 2006/0039371 | A1 | 2/2006 | Castro et al. |
| 2006/0128406 | A1 | 6/2006 | Macartney |
| 2007/0005738 | A1 | 1/2007 | Alexion-Tiernan et al. |
| 2007/0171844 | A1 | 7/2007 | Loyd et al. |
| 2007/0211651 | A1 | 9/2007 | Ahmed et al. |
| 2007/0230482 | A1 | 10/2007 | Shim et al. |
| 2008/0082628 | A1 | 4/2008 | Rowstron et al. |
| 2008/0133582 | A1 | 6/2008 | Andersch et al. |
| 2008/0258880 | A1 | 10/2008 | Smith et al. |
| 2008/0263031 | A1 | 10/2008 | George et al. |
| 2008/0288646 | A1 | 11/2008 | Hasha et al. |
| 2009/0125639 | A1 | 5/2009 | Dam et al. |
| 2009/0271360 | A1 | 10/2009 | Bestgen et al. |
| 2009/0285204 | A1 | 11/2009 | Gallant et al. |
| 2009/0319503 | A1 | 12/2009 | Mehul et al. |
| 2009/0328115 | A1 | 12/2009 | Malik |
| 2010/0070570 | A1 | 3/2010 | Lepeska |
| 2010/0085948 | A1 | 4/2010 | Yu et al. |
| 2010/0094862 | A1 | 4/2010 | Bent et al. |
| 2010/0296416 | A1 | 11/2010 | Lee et al. |
| 2010/0306252 | A1 | 12/2010 | Jarvis et al. |
| 2011/0231431 | A1 * | 9/2011 | Kamiwada ............ G06F 16/335 707/769 |
| 2011/0271319 | A1 * | 11/2011 | Venable, Sr. ........... H04L 43/08 709/224 |
| 2012/0110183 | A1 | 5/2012 | Miranda et al. |
| 2012/0269096 | A1 | 10/2012 | Roskind |
| 2013/0110931 | A1 * | 5/2013 | Kim ..................... H04L 67/104 709/204 |
| 2013/0170336 | A1 * | 7/2013 | Chen ..................... H04L 12/44 370/256 |
| 2013/0276053 | A1 | 10/2013 | Hugard, IV et al. |
| 2014/0075505 | A1 | 3/2014 | Subramanian |
| 2014/0101133 | A1 | 4/2014 | Carston et al. |
| 2014/0149557 | A1 | 5/2014 | Lohmar et al. |
| 2014/0164552 | A1 | 6/2014 | Kim et al. |
| 2014/0181247 | A1 | 6/2014 | Hindawi et al. |
| 2014/0181295 | A1 * | 6/2014 | Hindawi ................. H04L 41/04 709/224 |
| 2014/0244727 | A1 | 8/2014 | Kang et al. |
| 2014/0280280 | A1 | 9/2014 | Singh |
| 2014/0375528 | A1 | 12/2014 | Ling |
| 2015/0080039 | A1 | 3/2015 | Ling et al. |
| 2015/0149624 | A1 * | 5/2015 | Hindawi ................. H04L 41/12 709/224 |
| 2015/0163121 | A1 | 6/2015 | Mahaffey et al. |
| 2015/0172228 | A1 * | 6/2015 | Zalepa ................. H04L 12/1813 709/206 |
| 2015/0256575 | A1 | 9/2015 | Scott |
| 2015/0372911 | A1 | 12/2015 | Yabusaki et al. |

(56) References Cited

U.S. PATENT DOCUMENTS

| | | | |
|---|---|---|---|
| 2015/0373043 | A1 | 12/2015 | Wang et al. |
| 2016/0080408 | A1 | 3/2016 | Coleman et al. |
| 2016/0119251 | A1 | 4/2016 | Solis et al. |
| 2016/0269434 | A1 | 9/2016 | DiValentin et al. |
| 2016/0286540 | A1 | 9/2016 | Hindawi et al. |
| 2016/0352588 | A1* | 12/2016 | Subbarayan ............ H04L 67/42 |
| 2016/0360006 | A1 | 12/2016 | Hopkins et al. |
| 2017/0118074 | A1 | 4/2017 | Feinstein et al. |
| 2018/0013768 | A1* | 1/2018 | Hunt ....................... H04L 63/14 |
| 2018/0039486 | A1 | 2/2018 | Kulkarni et al. |
| 2018/0074796 | A1 | 3/2018 | Alabes et al. |
| 2018/0191747 | A1 | 7/2018 | Nachenberg et al. |
| 2018/0267794 | A1 | 9/2018 | Atchison et al. |
| 2018/0351792 | A1* | 12/2018 | Hunter ................. H04L 41/0883 |
| 2018/0351793 | A1* | 12/2018 | Hunter .................. H04L 41/082 |
| 2019/0280867 | A1* | 9/2019 | Kurian .................. H04L 9/0861 |
| 2020/0028890 | A1* | 1/2020 | White ................. H04L 61/2007 |
| 2020/0053072 | A1 | 2/2020 | Glozman et al. |
| 2020/0198867 | A1 | 6/2020 | Nakamichi |

OTHER PUBLICATIONS

Hood, Proactive Network-Fault Detection, Sep. 1997, 9 pages.

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.

Rao et al., "Optimal Resource Placement in Structured Peer-to-Peer Networks," Jul. 2010, IEEE Transactions on Parallel and Distributed Systems, vol. 21, No. 7, 16 pgs.

Tanium Inc, International Search Report and Written Opinion, PCT/US2013/076971, dated Apr. 4, 2014, 17 pgs.

Tanium Inc, International Preliminary Report on Patentability, PCT/US2013/076971, dated Jun. 23, 2015, 14 pgs.

Tanium Inc, International Search Report and Written Opinion, PCT/US2014/067607, dated Feb. 18, 2015, 13 pgs.

Tanium Inc, International Preliminary Report on Patentability, PCT/US2014/067607, dated May 31, 2016, 10 pgs.

Tanium Inc, International Search Report and Written Opinion, PCT/US2015/0020780, dated Jul. 2, 2015, 13 pgs.

Tanium Inc, International Preliminary Report on Patentability, PCT/US2015/0020780, dated Sep. 27, 2016, 9 pgs.

Hindawi, Office Action, U.S. Appl. No. 15/702,617, dated Jun. 1, 2018, 37 pgs.

Hindawi, Final Office Action, U.S. Appl. No. 15/702,617, dated Dec. 27, 2018, 54 pgs.

Hunt, Office Action dated Oct. 4, 2018, U.S. Appl. No. 15/215,468, 13 pgs.

Hunt, Notice of Allowance dated Jan. 24, 2019, U.S. Appl. No. 15/215,468, 8 pgs.

Hunt, Notice of Allowance dated Apr. 1, 2019, U.S. Appl. No. 15/215,468, 8 pgs.

Hunt, Office Action dated Sep. 10, 2018, U.S. Appl. No. 15/215,474, 10 pgs.

Hunt, Final Office Action dated Apr. 1, 2019, U.S. Appl. No. 15/215,474, 7 pgs.

Hunt, Notice of Allowance, U.S. Appl. No. 15/713,518, dated Apr. 10, 2019, 14 pgs.

Lippincott, Notice of Allowance, U.S. Appl. No. 15/878,286, dated Apr. 25, 2019, 9 pgs.

Jae Woo Lee, Henning Schulzrinne, Wolfgang Kellerer and Zoran Despotovic, 0 to 10k in 20 Seconds: Bootstrapping Large-Scale DHT Networks, pp. 1-6, Jun. 9, 2011 (Year: 2011).

Ion Stoica, Robert Morris, David Karger, M. Frans Kaashoek, Hari Balakrishnan, Chord: A Scalable Peertopeer Lookup Service for Internet Applications, 2001, pp. 1-12 (Year: 2002)

Ping Wang, Baber Aslann, Cliff C. Zou, Peer-to-Peer Botnets: The Next Generation of Botnet Attacks, Jan. 2010, pp. 1-25 (Year: 2010).

Sean Rhea, Dennis Geels, Timothy Roscoe, and John Kubiatowicz, Handling Churn in a DHT, 2004, pp. 1-14 (Year: 2004).

Richards, Non-Final Office Action, U.S. Appl. No. 16/443,720, dated Sep. 4, 2020, 11 pgs.

Richards, Notice of Allowance, U.S. Appl. No. 16/443,720, dated Feb. 9, 2021, 8 pgs.

Richards, Notice of Allowance, U.S. Appl. No. 16/443,720, dated Jun. 15, 2021, 7 pgs.

Goela, Non-Final Office Action, U.S. Appl. No. 16/943,291, dated Jul. 16, 2021, 15 pgs.

Freilich, Non-Final Office Action, U.S. Appl. No. 17/129,638, dated Jul. 23, 2021, 6 pgs.

Richards, Notice of Allowance, U.S. Appl. No. 16/443,720, dated Aug. 4, 2021, 2 pgs.

Goela, Notice of Allowance, U.S. Appl. No. 16/943,291, dated Oct. 1, 2021, 8 pgs.

Hindawi, Non-Final Office Action, U.S. Appl. No. 16/917,800, dated Jul. 1, 2021, 6 pgs.

Hindawi, Notice of Allowance, U.S. Appl. No. 16/917,800, dated Oct. 25, 2021, 2 pgs.

Hindawi, Notice of Allowance, U.S. Appl. No. 16/917,800, dated Oct. 15, 2021, 7 pgs.

Goela, Notice of Allowance, U.S. Appl. No. 16/943,291, dated Oct. 18, 2021, 5 pgs.

Freilich, Notice of Allowance, U.S. Appl. No. 17/129,638, dated Nov. 4, 2021, 8 pgs.

Hindawi, Notice of Allowance, U.S. Appl. No. 16/917,800, dated Nov. 18, 2021, 2 pgs.

Hindawi, Notice of Allowance, U.S. Appl. No. 16/917,800, dated Dec. 16, 2021, 2 pgs.

Goela, Notice of Allowance, U.S. Appl. No. 16/943,291, dated Feb. 25, 2022, 2 pgs.

Lippincott, Notice of Allowance, U.S. Appl. No. 15/930,342, dated Mar. 24, 2022, 7 pgs.

* cited by examiner

First Report 502

| Machine | Rule | Count of matching files | Total matches | Scan Progress |
|---|---|---|---|---|
| Machine 1 | Rule 1 | 1-10 | 51-100 | Complete |
| Machine 1 | Rule 2 | 11-50 | 101-500 | Complete |
| Machine 2 | Rule 2 | 11-50 | 51-100 | Complete |
| Machine 3 | Rule 1 | 1-10 | 1-50 | Complete |
| Machine 3 | Rule 3 | 1-10 | 51-100 | Complete |
| ⋮ | ⋮ | ⋮ | ⋮ | ⋮ |

Figure 5A

Second Report 520

| File ID | Count of matching file content | File Metadata |
|---|---|---|
| File 1 | 52 | Metadata 1 |
| File 2 | 24 | Metadata 2 |
| File 3 | 14 | Metadata 3 |
| File 4 | 8 | Metadata 4 |
| File 5 | 4 | Metadata 5 |
| ⋮ | ⋮ | ⋮ |

Figure 5B

Third Report 540

| File Snippets | Confirmed |
|---|---|
| SSN 123-45-6789 | Yes |
| 111-22-3434 | |
| 10/012345678 | |
| SSN 098-76-5432 | Yes |
| 181612141 | |
| ⋮ | ⋮ |

Figure 5C

First Report, Quick Search 602

| Machine | Count of matching files | Scan progress |
|---|---|---|
| Machine 1 | 1-10 | Complete |
| Machine 2 | 11-50 | Complete |
| Machine 3 | 11-50 | Complete |
| ⋮ | ⋮ | ⋮ |

Figure 6A

Second Report, Quick Search 620

| File ID | Count of matching file content | File Metadata |
|---|---|---|
| File 1 | 24 | Metadata 1 |
| File 2 | 8 | Metadata 2 |
| File 3 | 14 | Metadata 3 |
| File 4 | 4 | Metadata 4 |
| File 5 | 52 | Metadata 5 |
| ⋮ | ⋮ | ⋮ |

Figure 6B

Third Report, Quick Search 640

| File snippets | Location |
|---|---|
| add or remove app, website, or email accounts... | File ID, line count... |
| all your email, calendar events, and files in one place... | File ID, line count... |
| enter your email and password to access.... | File ID, line count... |
| ⋮ | ⋮ |

SYSTEM AND METHOD FOR PERFORMING SEARCH REQUESTS IN A NETWORK

PRIORITY CLAIM AND RELATED APPLICATIONS

This application claims priority to U.S. Provisional Patent Application No. 62/845,827, filed May 9, 2019, and is also a continuation-in-part of U.S. application Ser. No. 16/532, 391, filed Aug. 5, 2019, which is a continuation-in-part of both (1) U.S. application Ser. No. 15/215,474, filed Jul. 20, 2016, titled "System and Method for Performing Event Inquiries in a Network," now U.S. Pat. No. 10,482,242, and (2) U.S. application Ser. No. 15/215,468, filed Jul. 20, 2016, titled "Cost Prioritized Evaluations of Indicators of Compromise," now U.S. Pat. No. 10,372,904, both of which claim the benefit of U.S. Provisional Application Ser. No. 62/333,768, filed May 9, 2016, titled "System and Method for Performing Event Inquiries in a Network," and U.S. Provisional Patent Application Ser. No. 62/305,482, filed Mar. 8, 2016, titled "Cost Prioritized Evaluations of Indicators of Compromise." The content of each of the above applications is hereby incorporated by reference in its entirety.

This application is related to U.S. patent application Ser. No. 13/797,946, filed Mar. 12, 2013, now U.S. Pat. No. 9,246,977, titled "System and Network Management Using Self-Organizing Communication Orbits in Distributed Networks"; U.S. patent application Ser. No. 12/412,623, filed Mar. 27, 2009, now U.S. Pat. No. 8,086,729, titled "Distributed Statistical Detection of Network Problems and Causes"; U.S. patent application Ser. No. 13/084,923, filed Apr. 12, 2011, now U.S. Pat. No. 8,904,039, titled "Large-Scale Network Querying and Reporting"; U.S. patent application Ser. No. 13/107,625, filed May 13, 2011, now U.S. Pat. No. 8,903,973, titled "Parallel Distributed Network Management"; U.S. patent application Ser. No. 14/553,769, filed Nov. 25, 2014, titled "Fast Detection and Remediation of Unmanaged Assets"; U.S. patent application Ser. No. 14/554,739, filed Nov. 26, 2014, titled "Data Caching and Distribution in a Local Network"; and U.S. patent application Ser. No. 15/136,790, filed Apr. 22, 2016, titled "Reliable Map-Reduce Communications in a Decentralized, Self-Organizing Communication Orbit of a Distributed Network." Content of each of the above applications is hereby incorporated by reference in its entirety. The above applications are also referred to hereafter as "the Related Applications" or "the Incorporated Disclosure."

TECHNICAL FIELD

The present disclosure relates to secure search and management of computers in computer networks.

BACKGROUND

Network administrators (e.g., administrators of enterprise-level networks, such as banking networks, e-Commerce networks, etc.) often hire third-party cybersecurity companies to monitor and respond to threats. Thus, those responding to security incidents are often located remotely from the network rather than within it. Nevertheless, when a possible threat is detected, security incident responders need to be able to perform forensic investigations on machines within the network, e.g., by inquiring into events at the machines. But because network machines are often isolated from (e.g., remote from) the servers used by security incident responders (e.g., isolated by a firewall), it is difficult for these remote servers to communicate directly with machines within the network. Network administrators simply do not want to allow direct communication of remote computers with machines within their networks if the channels of communication cannot be trusted.

SUMMARY

Accordingly, there is a need within the realm of threat detection and management for trusted connections between a machine in a network and a remote server (e.g., a third-party investigating server). To that end, a method is provided for monitoring a network (e.g., establishing trusted communication channels, performing searches and/or forensic investigation for security threats, etc.), where the network comprises a collection of machines that forms a linear communication orbit. The method is performed at a respective machine in the collection of machines. The respective machine receives at a first time a first query through the linear communication orbit, where the first query has been propagated from a respective server (e.g., the third-party investigating server) to the respective machine through one or more upstream machines, upstream of the respective machine, along the linear communication orbit, and the first query includes a set of one or more rules. In response to receiving the first query, the respective machine identifies, for each respective rule in the set of one or more rules, files (e.g., files stored at the respective machine) that contain file content that satisfies the respective rule. Subsequent to receiving the first query, the respective rule generates a first report identifying, for each rule in the set of one or more rules, a count of files at the respective machine that contain file content satisfying the rule. The respective machine then sends the first report through the linear communication orbit to the respective server via an end machine of the linear communication orbit. At a second time, subsequent to the first time, the respective machine receives an instruction packet from an external machine (e.g., external to the linear communication orbit) via the linear communication orbit. Unless the respective machine is at the head node of the linear communication orbit, the instruction packet is propagated to the respective machine through the one or more upstream machines along the linear communication orbit. The instruction packet includes an instruction for establishing a direct duplex connection between the respective machine and the external machine. In response to receiving the instruction packet through the linear communication orbit, the respective machine sends an outbound connection request to the external machine to establish the direct duplex connection between the respective machine and the external machine in accordance with a respective network connection protocol. The respective machine sends to the external machine, via the direct duplex connection, a second report including file identifying information identifying files at the respective machine that contain file content satisfying each rule in the set of one or more rule.

In some embodiments, the method includes receiving, at a third time subsequent to the second time, a second query through the direct duplex connection from the external machine, wherein the second query comprises one or more requests for snippets of information from a respective file identified as containing file content satisfying a respective rule in the set of one or more rules. In response to receiving the second query, the method includes sending to the external machine via the duplex direct connection a third report including one or more snippets corresponding to file content in the respective file that contributes to satisfaction of the respective rule.

In some embodiments, the third report includes snippet information identifying, for the respective file, locations in the respective file corresponding to the file content that contributes to satisfaction of the respective rule.

In some embodiments, the direct duplex connection is an encrypted communication connection in which information sent by the respective machine to the external machine is encrypted (e.g., to protect confidential information).

In some embodiments, the first query includes a single rule, the single rule specifying a string, represented by a sequence of hashed tokens, each hashed token corresponding to a predefined unit of text. Each of the hashed tokens comprises a result of applying a predefined one-way hash function to a corresponding token. The first report includes information corresponding to a count of files at the respective machine that contain file content matching the string specified by the single rule.

In some embodiments, identifying files that contain file content that satisfies the single rule includes performing lookups, in a reverse lookup table, of the hashed tokens in the sequence of hashed tokens, to identify files having content matching units of text in the string specified by the single rule.

In some embodiments, each rule in the set of one or more rules includes a primary rule, and a respective rule in the set of one or more rules includes one or more validation rules that are logically combined with the primary rule of the respective rule to determine whether respective file content (e.g., one or more hits in the respective file) satisfies the respective rule.

In some embodiments, the one or more validation rules of the respective rule include one or more positive validation rules, and determining whether a respective file satisfies the respective rule includes determining a number of hits in the respective file, each hit corresponding to file content in the respective file that satisfies both the primary rule of the respective rule and at least one positive validation rule of the respective rule.

In some embodiments, the one or more validation rules of the respective rule include one or more positive validation rules, and determining whether a respective file satisfies the respective rule includes determining whether file content within the respective file satisfies at least one positive validation rule in the one or more positive validation rules.

In some embodiments, the one or more validation rules of the respective rule include one or more negative validation rules, and determining whether a respective file satisfies the respective rule includes determining a number of hits in the respective file, each hit corresponding to file content in the respective file that satisfies the primary rule of the respective rule and does not satisfy any negative validation rule in the one or more negative validation rules of the respective rule.

In some embodiments, the one or more validation rules of the respective rule include one or more negative validation rules, and the method includes determining whether a respective file does not satisfy the respective rule, including determining whether file content within the respective file satisfies at least one negative validation rule in the one or more negative validation rules.

In some embodiments, the first report is stored in a local database of the respective machine prior to receiving the first query, and the second report is stored in the local database of the respective machine prior to receiving the second query.

In some embodiments, the external machine is the respective server.

In some embodiments, the primary rule of each rule in the set of one or more rules corresponds to a respective regular expression (e.g. a content pattern). However, in some embodiments, each primary rule includes a content pattern, of which regular expressions are a subset.

In some embodiments, a respective rule in the set of one or more rules includes executable instructions, or a reference to executable instructions, for determining if content matching the regular expression of the corresponding primary rule satisfies additional criteria required for satisfying the respective rule.

In some embodiments, the method includes receiving and responding to, via the linear communication orbit, a third query, wherein the third query includes an updated version of at least one rule in the set of one or more rules.

In some embodiments, a computer system (e.g., machine 102, administrator's device 116, server 108 and/or server 110, FIGS. 1A-1B, FIGS. 7-9) includes one or more processors and memory storing one or more programs for execution by the one or more processors, the one or more programs include instructions for performing, or controlling performance of, the operations of any of the methods described herein.

In some embodiments, a non-transitory computer readable storage medium stores one or more programs, the one or more programs comprising instructions, which, when executed by a computer system (e.g., machine 102, administrator's device 116, server 108 and/or server 110, FIGS. 1A-1B, FIGS. 7-9) with one or more processors, cause the computer system to perform, or control performance of, the operations of any of the methods described herein.

In some embodiments, a computer system (e.g., machine 102, administrator device 116, server 108 and/or server 110, FIGS. 1A-1B, FIGS. 7-9) includes means for performing, or controlling performance of, the operations of any of the methods described herein.

Other embodiments and advantages will be apparent to those skilled in the art in light of the descriptions and drawings in this specification.

BRIEF DESCRIPTION OF THE DRAWINGS

FIGS. 5A-5C collectively illustrate example reports produced or returned in response to queries, in accordance with some embodiments.

FIGS. 6A-6C collectively illustrate example reports produced in response to quick searches, in accordance with some embodiments.

Like reference numerals refer to corresponding parts throughout the drawings.

DESCRIPTION OF EMBODIMENTS

Figure 1A:
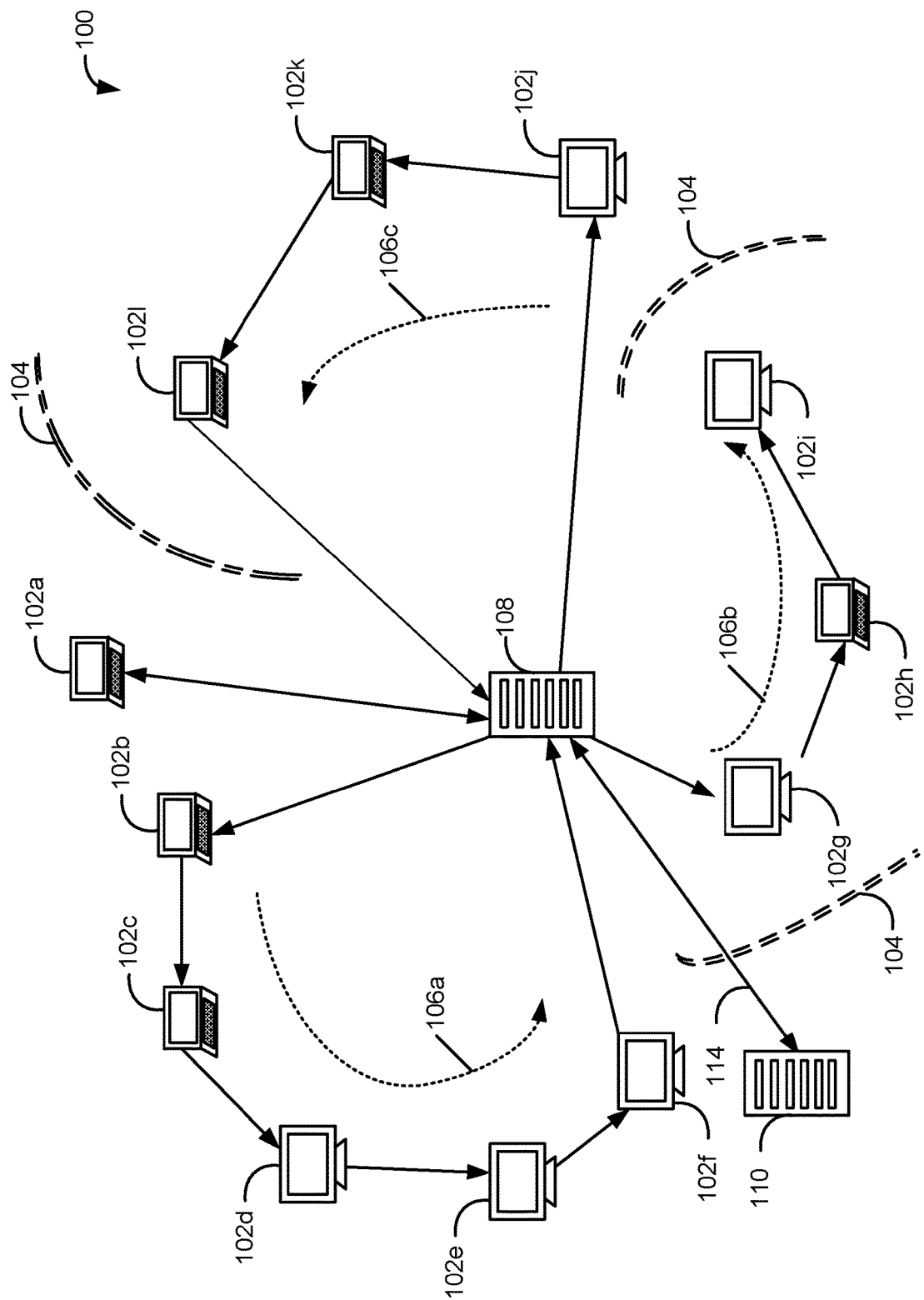
FIGS. 1A-1B illustrate a computer network organized into linear communication orbits, in accordance with some embodiments.

Some methods and devices described herein improve upon endpoint machine examination and management by a) providing for endpoint self-examination (e.g., upon receipt of a set of search rules), b) providing for quicker search result reports from a network of machines, and c) establishing a trusted client-initiated connection (e.g., for investigation by a remote server or administrator's machine).

In some embodiments, the client is a respective machine in a collection of machines that forms a linear communication network (e.g., a non-branching bi-directional communication orbit) as described in the Incorporated Disclosure, which sets forth a network topology in which messages are passed from machine to machine within the linear communication orbit. To initiate a search of client machines, a respective server injects a set of rules into the linear communication orbit. This set of rules travels from machine to machine though machines upstream (in the linear communication orbit) of the respective machine before reaching the respective machine. In response to receiving the set of rules, the respective machine performs a search of relevant files stored at the respective machine and builds a local data base of rule evaluation results.

The client-initiated outbound connection can be used subsequently by the remote server to request reports from the client without requiring the client to open its network firewall (e.g., without requiring the client to open inbound ports in its network firewall). To establish the trusted client-initiated connection, the remote server injects an instruction packet into the linear communication orbit, which travels from machine to machine through the machines upstream of the respective machine before reaching the respective machine. The instruction packet includes instructions for establishing a direct duplex connection (e.g., a direct full-duplex connection, such as a WebSocket connection) with the remote server (or an external administration machine. The respective machine establishes the direct duplex connection according to the instructions received through the linear communication orbit. Thereafter, the respective machine can send secure messages (e.g., encrypted messages) and upload report data directly to the remote server (e.g., rather than by propagating messages from machine to machine through the linear communication orbit); and, the remote server can interact directly with the respective machine in the network rather than through the network's server and the linear communication orbit.

The direct duplex connection (e.g., a point-to-point direct full-duplex connection) can be used by security incident responders, (who are, for example, network administrators of the monitored network, and/or third-party security incident responders associated with the remote server) to pull local data from the respective machine, including event histories, malware files and artifacts, etc. In some embodiments, the remote server can setup a sandbox environment (e.g., a virtual machine mirroring certain conditions and/or files on the respective machine) to perform forensic investigation of security incidents on the respective machine.

In a typical scenario, a remote server or external machine sends a set of one or more rules to some or all of the machines in the network using machine-to-machine communication within the linear communication orbit and server-to-server communication to communicate back to the external machine. A respective machine in the linear communication orbit receives (e.g., through the linear communication orbit) an initial query including a set of one or more rules. To request a direct connection (e.g., to send and receive sensitive material), the remote server uses the linear communication orbit to send an instruction packet to the particular machine, and allows the particular machine to establish a direct duplex connection with the remote server through an outbound connection request from the particular machine to the remote server. The remote server then takes a deep-dive (e.g., performs forensic analysis) into event histories at the particular machine using the direct duplex connection (e.g., requesting the machine to upload event artifact data and/or to upload a snapshot of a local event database, and requesting the machine to answer one or more queries, etc.).

Figure 7:
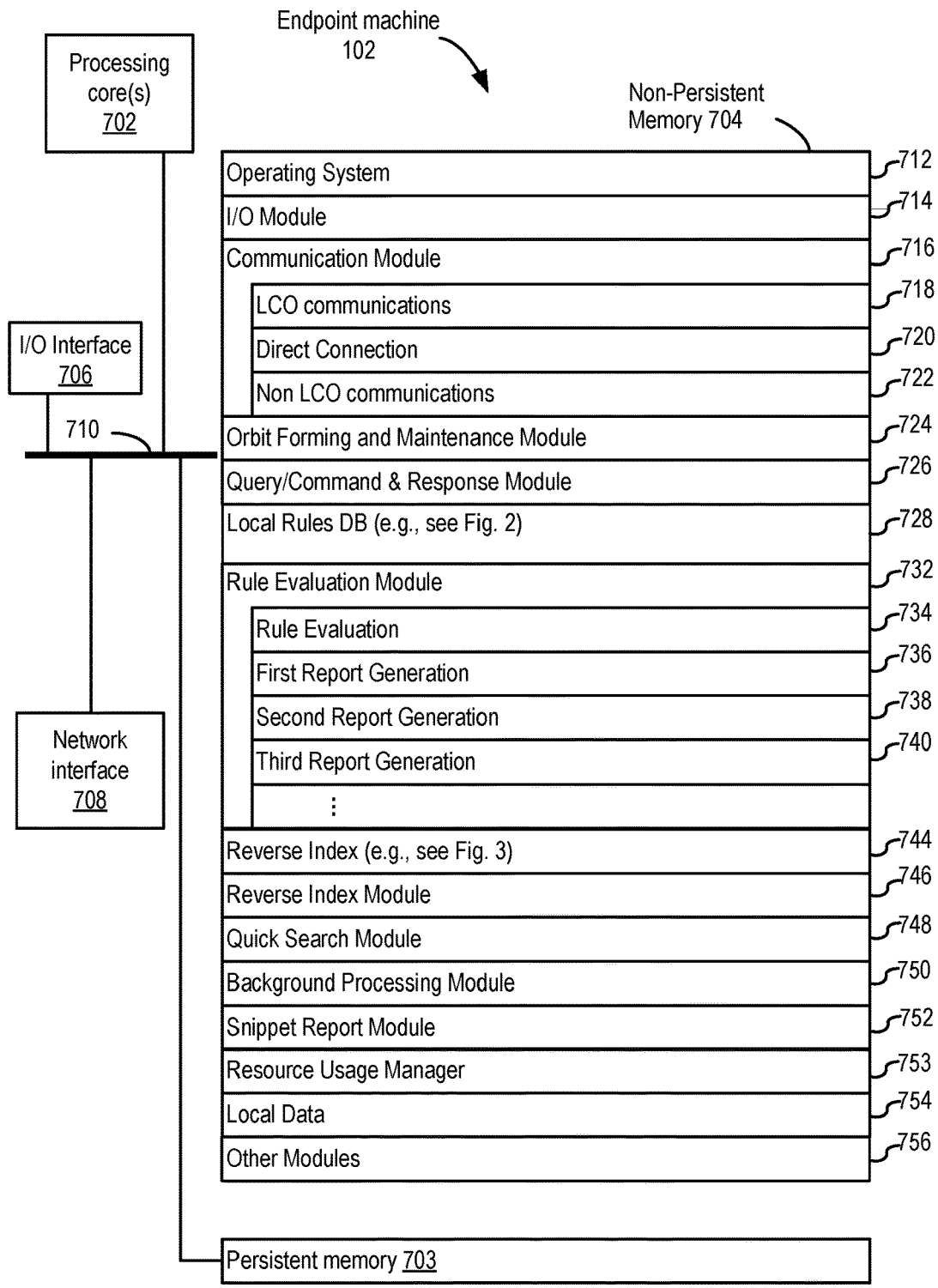
FIG. 7 is a block diagram of a system (e.g., an exemplary endpoint machine), in accordance with some embodiments.
Figure 8:
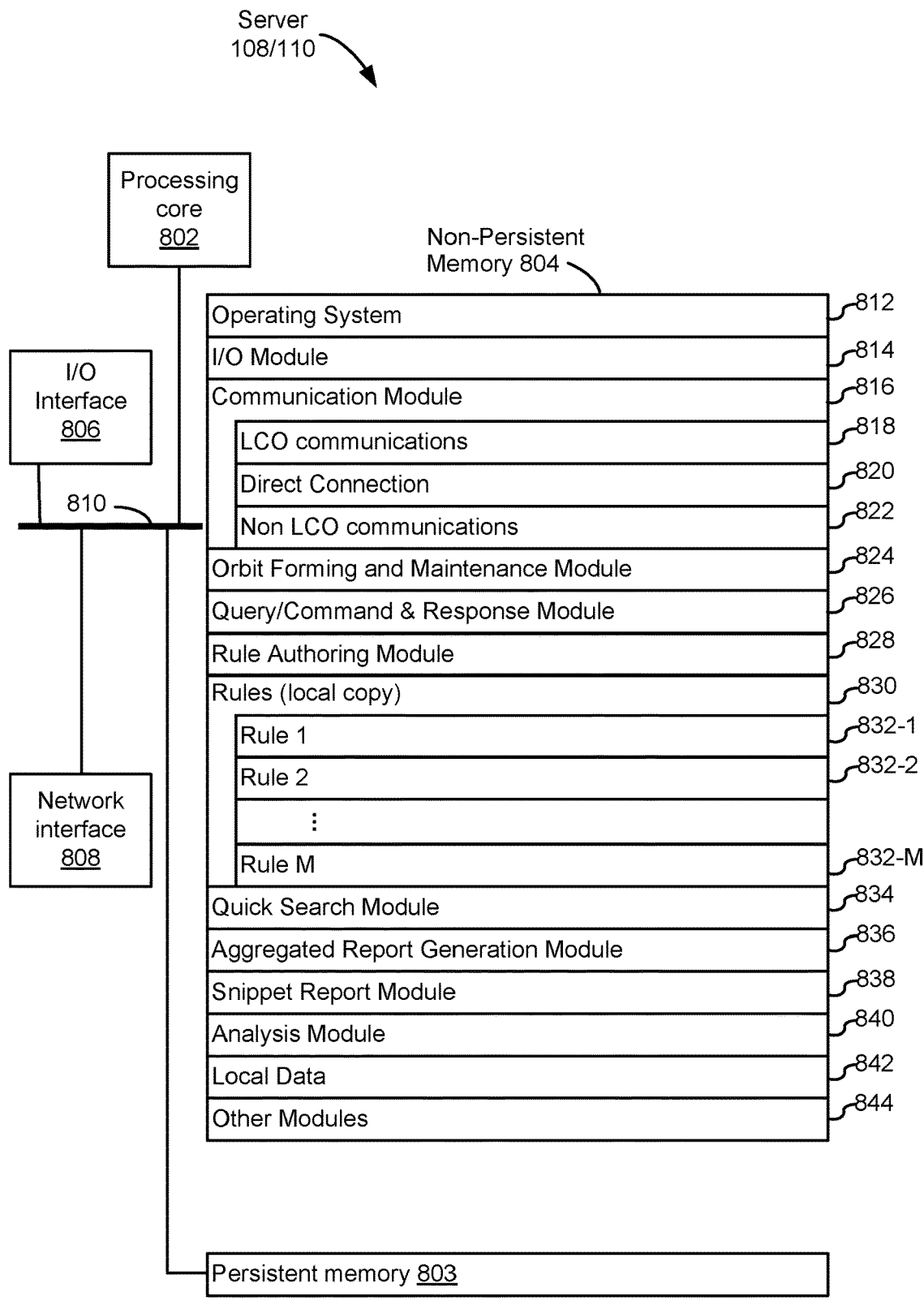
FIG. 8 is a block diagram of a system (e.g., an exemplary server of the network), in accordance with some embodiments.
Figure 9:
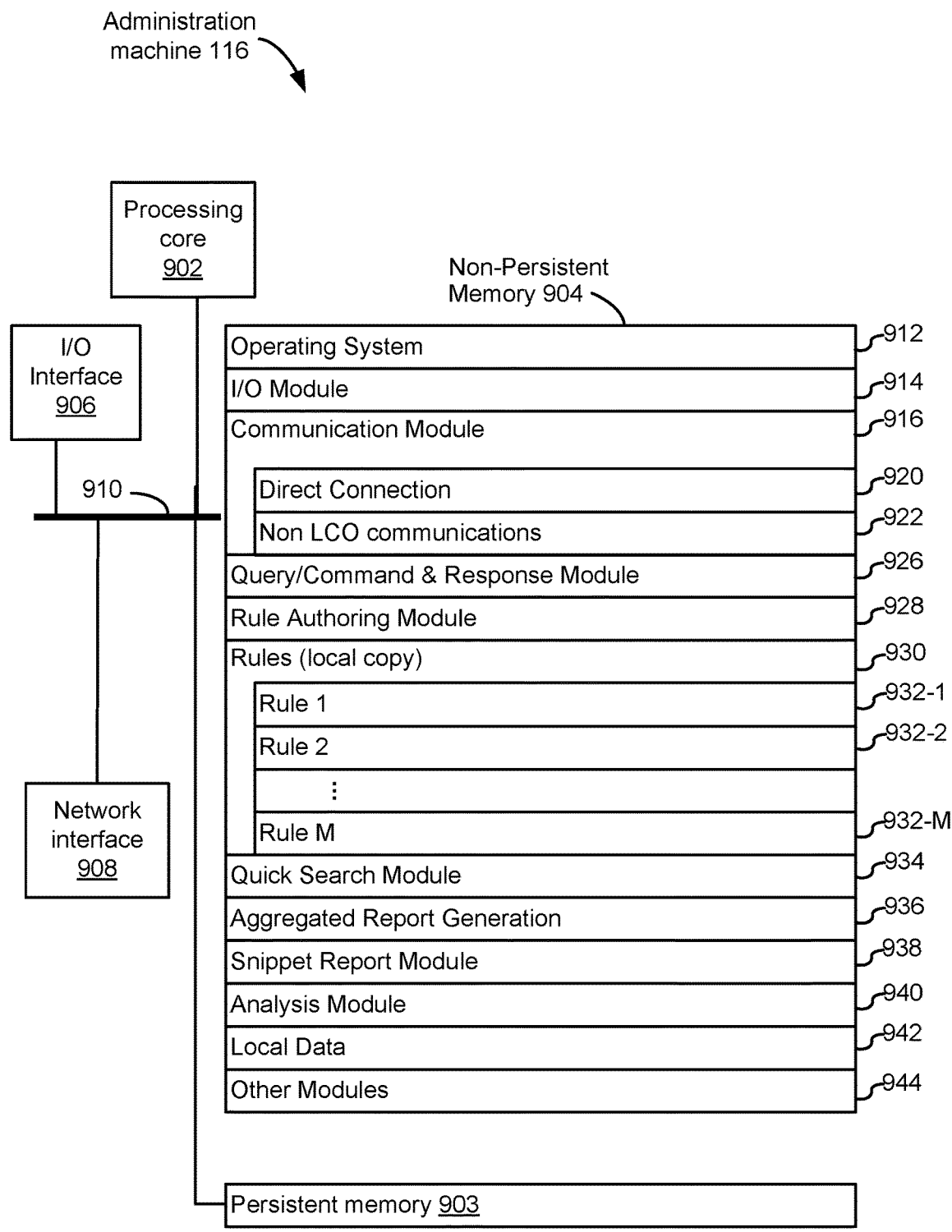
FIG. 9 is a block diagram of a system (e.g., an exemplary administrator's device or machine external to the network), in accordance with some embodiments.

Linear communication orbits are described below with reference to FIG. 1A. FIG. 1B illustrates a schematic diagram of a direct duplex connection between a machine in a linear communication orbit and a remote server. FIGS. 7-9 are block diagrams of machines in a network or machines interacting with a network (e.g., a machine, a server of a network, and an administrator's device).

Figure 1B:
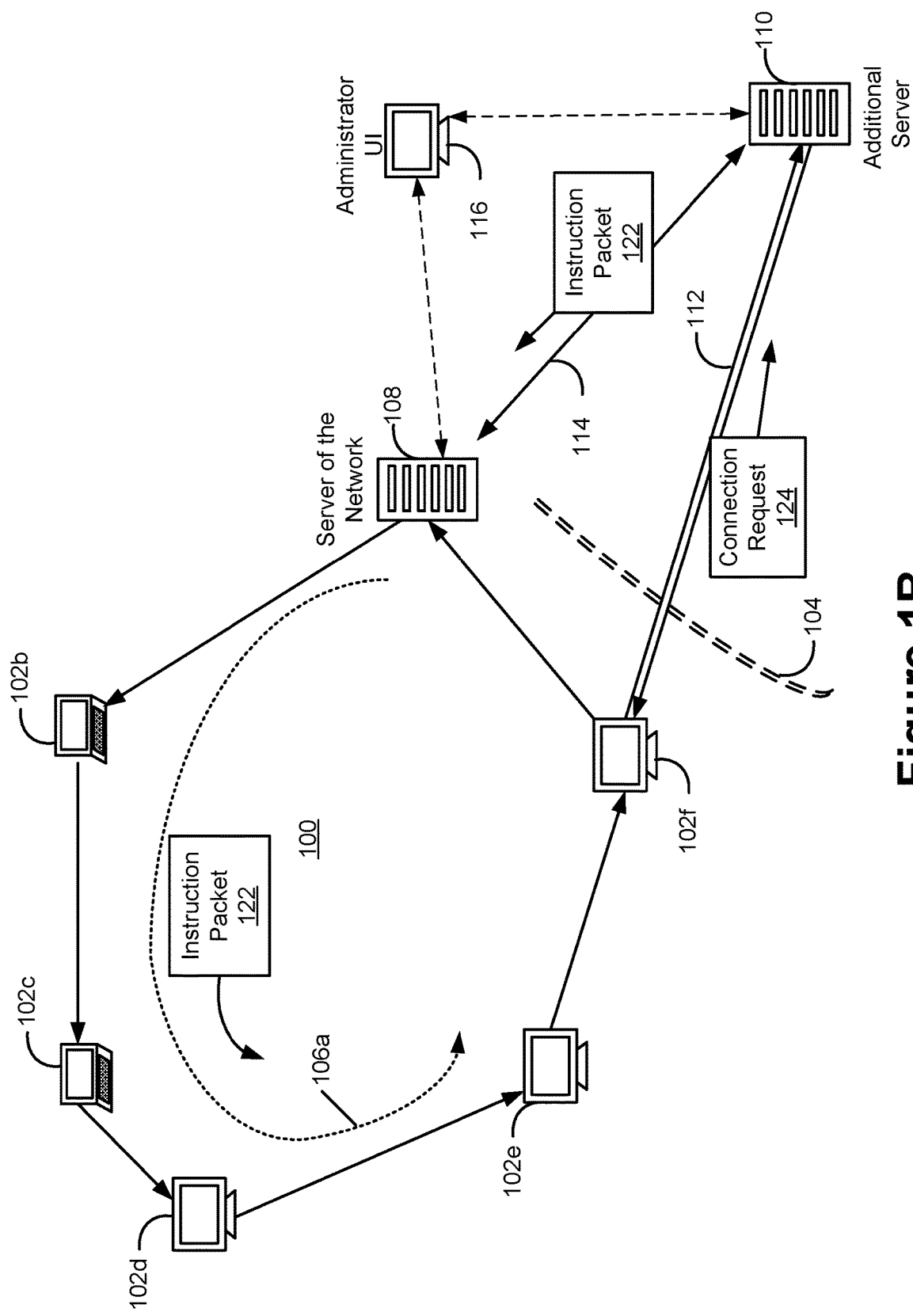

FIG. 1A illustrates a computer network organized into linear communication orbits, in accordance with some embodiments. More specifically, FIG. 1A illustrates a managed network 100 comprising a plurality of interconnected machines 102 (including 102*a*-1), e.g., computers, servers, mobile devices, and other networked devices that are arranged into one or more linear communication orbits. In some embodiments, the network monitoring methods described herein are performed at one or more machines (e.g., machine 102, see FIGS. 1A and 1B) of a linear communication orbit. In some embodiments, the methods described herein are performed at a remote server (e.g., remote server 110) that is not part of network 100 and is optionally separated from network 100 by a firewall 104, see FIGS. 1A and 1B). In some embodiments, the methods described herein are performed at an administrator's device (e.g., administrator's device 116 that interacts with one or more machines 102 through server 108 of the network and/or remote server 110, see FIG. 1). The linear communication orbit structure shown in FIG. 1A is an alternative to the conventional hub-and-spoke or hierarchical architecture for managed networks. However, in some embodiments, the network monitoring methods described herein are performed at one or more machines/servers of a hub-and-spoke network, where the remote server sends the instruction packet to a respective machine through the server of the hub-and-spoke network or the top machine of hierarchical architecture, and allow the respective machine to initiate the outbound connection request to the remote server. However, in such cases, the benefit and efficiency of the linear communication orbit may be lost.

Examples of managed network 100 include enterprise networks or other networks under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, the network 100 is separated from external networks by one or more firewalls 104.

In some embodiments, machines 102 currently coupled to network 100 are self-organized into one or more contiguous segments 106 of a single linear communication orbit. In some embodiments, each contiguous segment 106 constitutes a respective linear communication orbit. Methods of self-organization of linear communication orbits are further described in U.S. application Ser. No. 15/004,757, filed Jan. 22, 2016, now U.S. Pat. No. 10,136,415, entitled "System, Security and Network Management Using Self-Organizing Communications Orbits in Distributed Networks," which is hereby incorporated by reference in its entirety.

In some embodiments, managed network 100 also includes server 108 that facilitates the creation and maintenance of the one or more contiguous segments 106. The server 108 may be relatively lightweight, and in some embodiments may be elected from machines 102 in the network.

In some embodiments, as shown in FIG. 1A, the linear communication orbit linking all of the machines coupled to network 100 includes a respective communication channel between each pair of adjacent machines in an ordered sequence of all machines 102 in network 100. In some embodiments, communication between a pair of adjacent machines 102 (e.g., machine 102g and machine 102f) across a firewall 104 may need to be bridged by an intermediate server (e.g., server 108).

An important feature of linear communication orbit(s) 106 is that, in some embodiments, they are automatically formed without global, continuous, and/or active intervention by any network administrative program or personnel. Each machine 102 joining network 100 is equipped with (or provided with) a set of predetermined organization rules. According to the set of predetermined organization rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit grows or contracts as machines join and leave network 100 (e.g., the network is non-static), through the independent local actions of the machines in network 100, without global, continuous, and/or active intervention by any network administrative programs or personnel. Although all machines 102 implement the same set of predetermined organization rules, and each machine directly interacts only with its immediate neighbor machines to facilitate the formation of the orbit, the predetermined organization rules are designed in a way that cause the machines' independent local actions to be globally consistent and to result in self-organization and automatic repair and maintenance of linear communication orbit(s) 106.

In some embodiments, all machines 102 coupled to network 100 are sorted into an ordered sequence according to a respective unique identifier associated with each machine 102. These identifiers are also referred to as the addresses of the machines in the network. For example, in some embodiments, respective IP addresses of machines 102 are used as the identifiers to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined organization rules provides a deterministic way of sorting the unique identifiers or addresses of that type into an ordered sequence. Given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

In some embodiments, each machine 102 receiving a communication message (e.g., a message including a question part, and an answer part) from its upstream neighbor machine acts upon the message by providing an update to the message based on its local state or information, performing some aggregation of the information in the message (e.g., by adding to or modifying aggregated results already included in the message as received from its upstream neighbor), and/or forwarding the message to its downstream neighbor machine along the linear communication orbit. Essentially, each machine expends a small amount of resources to take on a small part of the duties of data aggregation without being overly burdened. More details on how the system, security, and network management messages are propagated to and collected from machines 102 in network 100 through linear communication orbit(s) 106 are provided in the Incorporated Disclosure.

An advantage of conveying message communications over the linear communication orbit is that queries, answers, and/or instructions regarding threat detection and management can be quickly passed to and from many machines without excessive communication and computational overhead. In some embodiments, server 108 (or a remote server 110 in communication with server 108) generates individual queries, where each query contains a request for evaluation of one or more rules at one or more targeted machines (e.g., machines that meet certain criteria specified in the query). In some embodiments, the server determines the order, frequency, and/or priority by which the queries should be injected. In some embodiments, the server sends out all of the queries and the evaluation criteria that individual machines can use locally to prioritize the evaluation of the rules in the queries. The individual machines perform local evaluation of the rules with the order and frequencies set in accordance with the evaluation criteria, and send the results back to server 108 through the linear communication orbit.

In some embodiments, while queries are passed from endpoint machine to endpoint machine along a linear communication orbit, individual queries can be directed to or targeted to a subset of the endpoint machines in a linear communication orbit, so that only a specified subset of the endpoint machines in the linear communication orbit process the query. For example, a respective query can include one or more filters specifying particular endpoint machines, and/or types of endpoint machines, and/or characteristics of endpoint machines, that are to process the query, while other endpoint machines that receive the query merely pass the query to the next endpoint machine in the linear communication orbit.

In some embodiments, server 108 sends the results (e.g., sends an aggregated response) to remote server 110. In some embodiments, remote server 110 communicates with server 108 via secure connection 114. In some embodiments, when remote server 110 needs to send a message or instruction packet to a particular machine in the network and a direct connection between remote server 110 and the particular machine does not already exist, remote server 110 optionally sends the message to server 108 and has server 108 forward the message or instruction packet to the particular machine along the linear communication orbit. In some embodiments, remote server 110 starts a network-wide information gathering processes by sending a series of queries to server 108 (or a head machine of the linear communication orbit), allowing server 108 (or the head machine) to propagate the queries into the network along the linear communication orbit, and receiving the answers or evaluation results (e.g., individual answers, aggregated answers, and/or metrics and statistics computed based on the answers or evaluation results collected from the machines in the network) from server 108 (or an end machine of the linear communication orbit).

The lightweight, decentralized mechanism (e.g., the set of common action rules observed by the machines in the network) allows the machines in the network to self-organize into one or more linear communication orbits, and allows the linear communication orbits to recover/self-heal from broken links and slow connections (e.g., by temporarily bypassing the unresponsive machines) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the machines in separate messages, and the messages may be propagated down the linear communication orbit, processed in parallel at the machines, and answered by as many machines as possible (e.g., machines that satisfy per matching criteria specified by the messages), without being held up by any slow responding machines. In fact, communication with and data collection from any and all machines in the network (e.g., enterprise networks with thousands or millions of machines) may be accomplished in substantially real-time (e.g., a matter of seconds), as opposed to taking days and weeks in a network with a conventional hierarchical or hub-and-spoke configuration. For example, messages are delivered to the machines at the speed at which messages are propagated through the linear communication orbit, and the processing of the queries at the machines occurs after receiving the messages, in parallel at the machines. In some embodiments, answers to the queries are collected in a subsequent traversal of the linear communication orbit by either the original messages (propagating in the reverse direction) or by subsequent "answer collection" messages.

FIG. 1B illustrates that, in some embodiments, remote server 110 communicates (e.g., sends messages and/or queries) directly with a respective machine (e.g., machine 102*f*) over direct duplex connection 112 (e.g., a WebSocket connection). Various methods are provided herein for establishing direct duplex connections between remote server 110 and machines 102 in a linear communication orbit. For example, a direct duplex connection is established between a respective machine and the remote server (e.g., remote server 100), in accordance with some embodiments. In some embodiments, the direct (e.g., point-to-point) duplex connection can be used by the remote server to perform event inquiries at the respective machine. In some embodiments, the remote server performs certain queries at the direction of an administrator. The administrator interacts with the remote server using an administrator's device (e.g., administrator's device 116) that is connected to the remote server (e.g., remote server 110) via a web interface or an application user interface provided by the remote server. In some embodiments, the administrator's device is also connected to a server of the network (e.g., server 108). The administrator can communicate with (e.g., issue instructions and questions, and receive responses) a particular machine in the network through the remote server, when a direct duplex connection has been established between the remote server and the particular machine. The administrator can also communicate with a particular machine through a server of the network (e.g., issue queries to the server of the network and have the query propagated along the linear communication orbit, and receive aggregated answers collect from machines along the linear communication orbit).

Direct duplex connection 112 is particularly useful when a remote server needs to take a deep-dive into a respective machine in the network (e.g., to carry out frequent back and forth interactions and/or to transfer large amount of local event data and/or to request sensitive information), rather than investigating the network at-large. The messages and/or queries can be analogous to those described above (or can contain different material), but they are sent directly to the respective machine via direct duplex connection 112 (rather than being propagated through linear communication orbit 106*a*), and without the communication needing to be bridged by server 108. In some embodiments, only those queries sent via a direct duplex connection return certain types of information to the external server (e.g., snippets of file text are only sent via secure direct duplex connections, not through a linear communication orbit). In some embodiments, remote server 110 can communicate with the respective machine either through direct duplex connection 112 (e.g., when remote server 110 wants to query only the respective machine) or through linear communication orbit 106*a* (e.g., when remote server 110 wants an aggregated response to a query from some or all of the machines 102 in the linear communication orbit 106*a*).

As described herein, the direct duplex connection between a particular machine and remote server 110 is established with the particular machine as the initiating party. In other words, from the perspective of the network, the connection is established with an outbound connection request sent from the machine, rather than with an inbound connection request sent from the remote server. When the direct duplex connection is established with an outbound connection request sent from the machine (e.g., the machine sends the initial connection request in the connection establishment protocol (e.g., the handshake request in establishing a WebSocket connection)), there is no need to open the firewall of the network, which would expose the network to outside security risks.

In some embodiments, in order to prompt a particular machine to initiate the connection request for a direct duplex connection, remote server 110 sends a message or instruction packet 122 to the particular machine (e.g., machine 102*f*) through a server of the network (e.g., server 108) and has the message or instruction packet 122 propagated to the particular machine through the linear communication orbit (e.g., linear communication orbit 106*a*). The message or instruction packet 122 contains instructions and necessary data (e.g., public certificate for encryption, IP address, port #) for the particular machine to establish the direct point-to-point persistent connection (e.g., a WebSocket connection) with the remote server. When the particular machine receives the instruction packet 122 from its upstream machine, the particular machine initiates the outbound connection request 124 to the remote server. After the remote server receives the connection request 124 from the particular machine, the remote server and the machine can proceed to establish the duplex connection according to the connection protocol.

In some embodiments, the direct connection is encrypted as described above. In some embodiments, the instructions comprise an instruction packet 122 that includes an encryption key for encrypting the local data at the respective machine before uploading to the local data to the respective server. The respective server possesses a decryption key corresponding to the encryption key. The instruction packet further includes instructions for encrypting the local data before uploading the local data to the respective server through the direct connection.

In some embodiments, apart from presenting the network monitoring user interface to an administrator, the administrator's device can also be a regular machine in the network and have the same characteristics and functions of other machines in the network with respect to the maintenance and workings of the linear communication orbit. In some embodiments, the server of the network can be lightweight and in some embodiments may be implemented by a machine in the network; thus, the administrator's device can also serve as the server of the network in some scenarios. When the administrator's device also serves as the server of the network, actions performed "through the server of the network" are performed by the administrator's device directly.

In some embodiments, the instruction packet 122 can be dispatched to one or more particular machines at the command of a network administrator or security incident responder. For example, the network administrator uses an administrator's device 116 to connect to remote server 110 (e.g., via a web interface or a client application provided by a service provider associated with the remote server 110) and manually selects the particular machines using a network monitoring user interface. In some embodiments, the network monitoring user interface provides other functions as described in the Incorporated Disclosure.

In some embodiments, an event recorder is deployed on each machine in the network that continuously records local values for particular indicator items (e.g., commonly used indicator items, such as filenames of newly created/modified/deleted/executed files, IP addresses of network connections, ports accessed, and processes started/killed, etc.) to a local event database. An administrator can query these local event databases from the network monitoring user interface by issuing questions to the network through the linear communication orbit. For example, the administrator's device can send the questions to the server of the network and the questions may be packaged in query messages and propagated to the machines through the server of the network. Each machine along the linear communication orbit will be able to respond quickly to these questions based on the past event data stored in their respective local event databases. After the answers have been collected from all relevant machines in the network, the server of the network forwards the answers back to the administrator's device.

In some embodiments, after a direct duplex connection has been established between a particular machine and the remote server, the administrator (using the administrator's device) can also query the local event database of the particular machine through the direction duplex connection. In addition, the administrator (using the administrator's device) can take a snapshot of the local event database on the particular machine and have it uploaded to the remote server, so that in-depth analysis regarding the particular machine may be performed at the remote server (e.g., according to instructions provided by the administrator to the remote server).

In some embodiments, after a direct duplex connection has been established between a particular machine and the remote server, the administrator (using the administrator's device) can collect snippets of file content from the particular machine from files of interest identified by evaluation of one or more rules by the respective machine. The administrator (using the administrator's device) can make a copy of the collected snippets and corresponding metadata (e.g., OS version, memory, installed apps, usernames, etc.).

In some embodiments, based on the in-depth analysis performed on a particular machine, the administrator can select particular snippets or files of interest in the network monitoring user interface and, based on analysis of those snippets or files, produce a set of refined rules (e.g., one or more new rules, the addition of one or more new validation rules to an existing rule, or another modification of an existing rule) that can be dispatched to the network for a network-wide analysis. In some embodiments, the administrator's machine, or another machines, is configured to automatically generate refined rules, or candidates for refined rules, based on the identification of examples of files or content that produced particular results in response to a prior version of the rules. The automatic generation of refined rules, or refined rule candidates, facilitates the investigative process of the administrator, and relieves the administrator from having to create the refined rules one by one from scratch.

Figure 2:
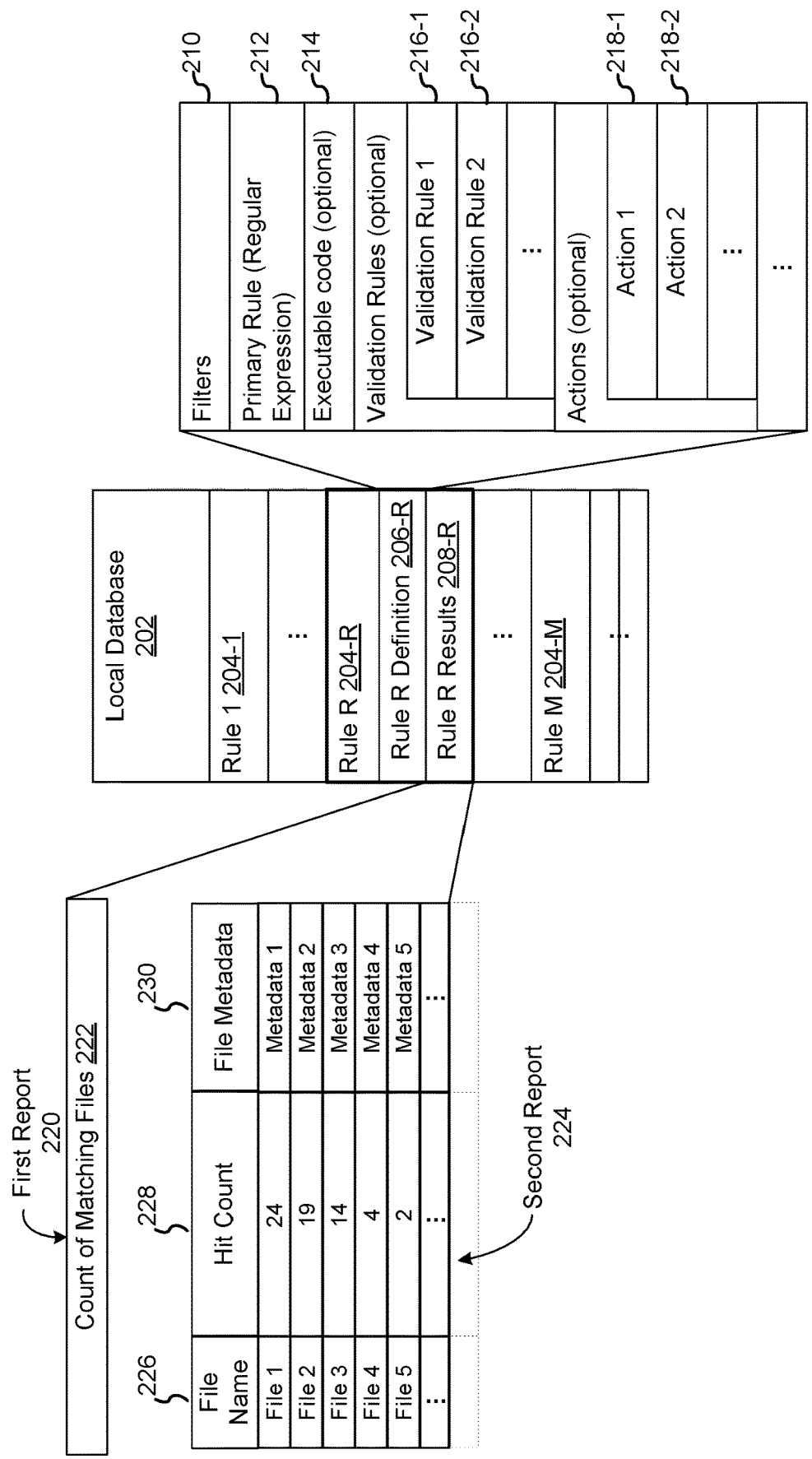
FIG. 2 illustrates an example local database including rule definitions and results, in accordance with some embodiments.

FIG. 2 illustrates an exemplary local database 202 at a respective machine 102. The local database 202 stores a set of one or more rules 204 (e.g., Rule 1, Rule R, and Rule M, etc.) and, for each rule, a rule definition 206 and rule results 208. In some embodiments, a rule comprises a regular expression that can be applied to a file. In some embodiments, a rule can contain zero or more filters and zero or more patterns. An example of a rule is "PDF files larger than 100 k that contain an email address and the name of a person." In the example shown in FIG. 2, rule definition for Rule 4 206-R includes one or more filters 210 (e.g., instructions on what types of files a respective rule should be applied to, such as "File is PDF" and "File is larger than 100 k"), a primary rule 212 (e.g., a pattern), executable code 214, and a set of two or more validation rules 216. Optionally, the rule definition 206 for a respective rule, such as rule definition 206-R for Rule R 204-R, also includes one or more actions 218, where a respective action 218 (e.g., action 218-1 or 218-2) specifies an action to be taken when one or more files satisfy the respective rule, such as Rule R 204-R. In some embodiments, a pattern is an operation that can generate a positive match (e.g., a hit) based on the text content of a file. Patterns can generally be described starting with "File contain." Many patterns are implemented as a regular expression. Examples of patterns include "File contains an email address" and "File contains the name of a person." In some embodiments, a validation rule is an operation that can make a positive match against a snippet of file content and apply a classification to the corresponding hit in the context of a rule. For example, validations can be described as "Hits where X should be Y." Examples of validations include "Emails from gmail.com should be rejected" or "Names preceded by 'Sincerely' should be validated."

The local database 202 of the respective machine also stores rule results 204 (e.g., based on hits). In some embodiments, a hit is a specific piece of text within a file that satisfies a pattern. Examples of hits include "john.doe@gmail.com" or "John Doe." Such rule results include, for each rule in the set of one or more rules, at least a first report 220 and a second report 224. The first report 220 includes a count of files 222 at the respective machine that include file content that satisfies the respective rule (e.g., files containing at least some content that satisfies rule R 204-R). Defining individual content in a file as satisfying a respective rule depends upon the content matching at least the primary rule 212 for the respective rule. In some embodiments, the second report 224 includes, or a respective rule, such as Rule R, 204-R, file identifying information 226 identifying files at the respective machine that contain file content satisfying each rule in the set of one or more rule. Optionally, the second report also includes a hit count 228 (i.e., a number of content items in the file that satisfy the respective rule) for each identified file, and also optionally includes file metadata 230 (e.g., file size, date created, date last modified, file type, etc.) for the file.

Furthermore, in some embodiments, the rule results 208 also include information identifying the file locations (sometimes called hit locations) of the hits for each rule. For example, the hit locations may be stored in an additional field for each row of the second report 224. In some embodiments, the hit locations are not conveyed along with the second reports, but are used to facilitate the generation of snippets from files identified by the second reports.

It is noted that in the description of FIG. 2, the term "first report" has been used to describe first information produced for a particular rule, and "second report" has been used to describe second information produced for a particular rule. However, in the descriptions provided below, with respect to embodiments in which the set of one or more rules includes a plurality of rules, the "first report" includes the first reports 220 for all the rules in the set of rules, and the "second report" includes the second reports 224 for all the rules in the set of rules.

Figure 3:
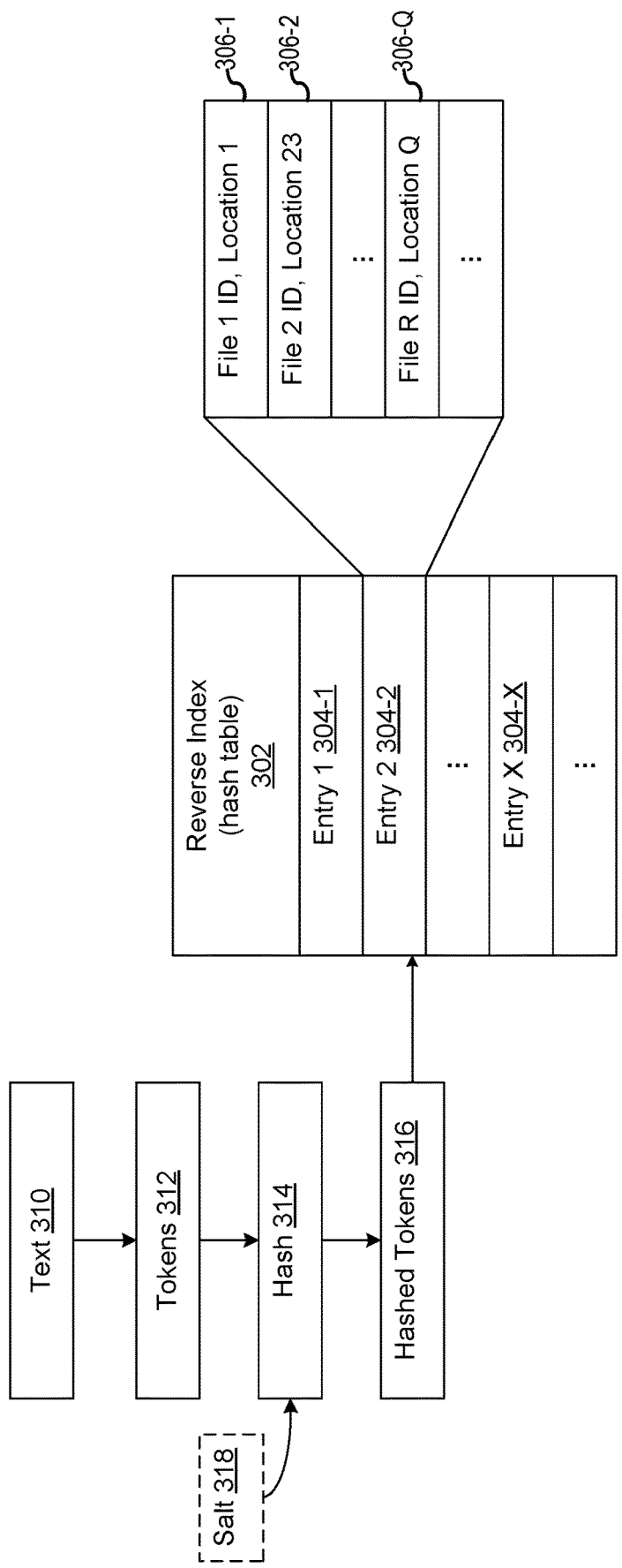
FIG. 3 illustrates an example reverse index, in accordance with some embodiments.

FIG. 3 illustrates an example reverse index 302 (e.g., implemented as a hash table), sometimes called an inverse index, that is stored locally at an endpoint machine 102 in a linear communication orbit. In some embodiments, the reverse index 302 includes one or more entries 304 (e.g., 304-1 to 304-X), where each entry 304 of the reverse index corresponds to a respective hashed token 316, and contains information, sometimes called sub-entries 306 (e.g., 306-1 to 306-Q), identifying files at the endpoint machine that contain text corresponding to the respective hashed token. In some embodiments, and typically, the information in an entry 306 identifies both the file, and one or more locations in the file, having text corresponding to the respective hashed token. It is noted that the data structure shown in FIG. 3 is a conceptual representation of the information stored in the reverse index 302, and of the method of generating hashed tokens, but that the details of how information is stored and organized within the reverse index may vary from one implementation to another. For example, in some implementations, one sub-entry 306 may list all the locations in a file that contain the same token, or may contain information (e.g., delta-encoded information) from which all such locations in the file can be derived, while in other implementations, a separate sub-entry 306 is used to indicate each such location.

Generally, each token 312 in a set of files, or in a reverse index 302 for that set of files, represents a chunk of text, such as a word, abbreviation, punctuation symbol, or the like, found in the set of files. Each token is typically represented by a digital value, which in some embodiments is the ASCII or other representation of the token's text, but in other embodiments is a fixed-length digital value that uniquely identifies the token. A hashed token 316 is produced by applying a one-way hash function 314 to the corresponding token 312 to produce a unique fixed-length value, herein called the hashed token. In some embodiments, the one-way hash function 314 is a predefined hash function, but the hash function receives, in addition to the token 312 to be hashed, a salt value 318. In any one system, the salt value 318 is a constant value that remains the same for all tokens, but prevents other systems that don't have the same salt value 318 from being able to search the reverse index 302 for information about the files stored at the respective endpoint system. Stated another way, within a system that uses hashed tokens to construct queries as well as to store information in the reverse index at each content machine 102, the same salt value 318 must be used by all the machines that work together on constructing queries (e.g., server 108 or 110 or administrator's device 116) that include hashed tokens and on answering those queries (e.g., endpoint machines 102).

Since hash functions can, on occasion, depending on their design, produce the same hash value for two different input values (sometimes called a "collision"), in some embodiments, the hash function 314 and the reverse index 302 include a mechanism for assigning unique hashed token values to all the tokens that produce the same initial hash value, or equivalently, ensuring that each distinct token 312 is assigned to a distinct entry 304 in the reverse index 302.

When adding information to the reverse index 302 for a file that is being indexed, each token 312 of the file's text 310 is hashed by the one-way hash function 314 to produce a hashed token 316, which in turn is used to identify an entry 304 of the reverse index 302. An identifier 306 is added to the entry 304, identifying the file in which the token is located, and optionally (and typically) also including information identifying the location in the file at which the token is located. Each token that is hashed by the one-way hash function 314 is hashed using the same salt value 318 (if any) as the salt value used by the server or administrator's machine to construct queries.

When removing information from the reverse index 302 for a file that has been removed from the endpoint machine, or that has been updated and is going to be re-indexed, all information items 306 corresponding to that file (e.g., having the filed identifier of the file) are removed from the reverse index.

When searching for files that have content (e.g., text) that includes a particular token, the token 312 is hashed 314 (e.g., by server 108 or the administrator's machine 116 that generates the query) to produce a hashed token 316. As noted above, the hashed token values are produced using a predefined one-way hash function 314, and optionally a salt value 318. When the query is received at an endpoint machine, the hashed token 316 is used by the endpoint machine to locate a corresponding entry 304 in the reverse index 302 for that endpoint machine; the corresponding entry 304 includes information identifying all the files (at the endpoint machine) having text matching the token 312. The use of hashed tokens to specify a text string in a search query helps to prevent interlopers (e.g., any machine eavesdropping on communications between machines in the network) from being able to determine the text string for which a search is being performed.

When searching, in response to a query, for files having a specified text string, corresponding to a string of tokens or hashed tokens, lookups in the reverse index 302 are performed for each of the tokens in the string of tokens, and then the results are combined to identify the files, if any, that contain the specified text string, and optionally to also identify the locations in those files at which the specified text string is located. In some embodiments, the query includes not only the hashed tokens in the same order as the corresponding terms are included in the specified text string, the query further includes arrangement information that indicates if any of the terms in the specified text string are separated by "skipped" words or terms, and if so, the arrangement information indicates how many skipped tokens (terms or words) are, or may be, located between specified tokens (e.g., by specifying that the third token follows, and is separated from, the second token by up for N tokens, where N is an integer such as 1, 2, 3, 4, 5 or the like), and this information is taken into account so that only documents that contain that exact phrase match the query (as opposed to simply including all the constituent terms). An example of a query that includes arrangement information would be: HT1, HT2, SEP/6, HT3, HT4 . . . , where HT1 to HT4 are hashed tokens, SEP/6 indicates that the second and third tokens can be separated by up to six tokens, and a matching string must include adjacent first and second tokens, corresponding to HT1 and HT2; adjacent third and fourth tokens, corresponding to HT3 and HT4; and the third token must follow the second token, but can be separated from the second token by up to six intervening tokens. Other arrangement information can be used in various embodiments, such as separation information that indicates an exact number tokens that separates to tokens, and/or separation information that indicates the separating term or terms must be of terms of one or more specific types (e.g., numerical, spaces, punctuation, etc.).

When generating and updating the reverse index (e.g., as performed by reverse index module 746, FIG. 7), the content format, sometimes called file type, of each file to be index is determined, so as to enable the content of the file to be indexed. In some embodiments, the reverse index module 746 uses both the mime type of a file, based on the presence of recognizable features in the first few kilobytes of the file, and its file extension to determine the content type of the file, and to extract text content from the file for indexing.

Figure 4A:
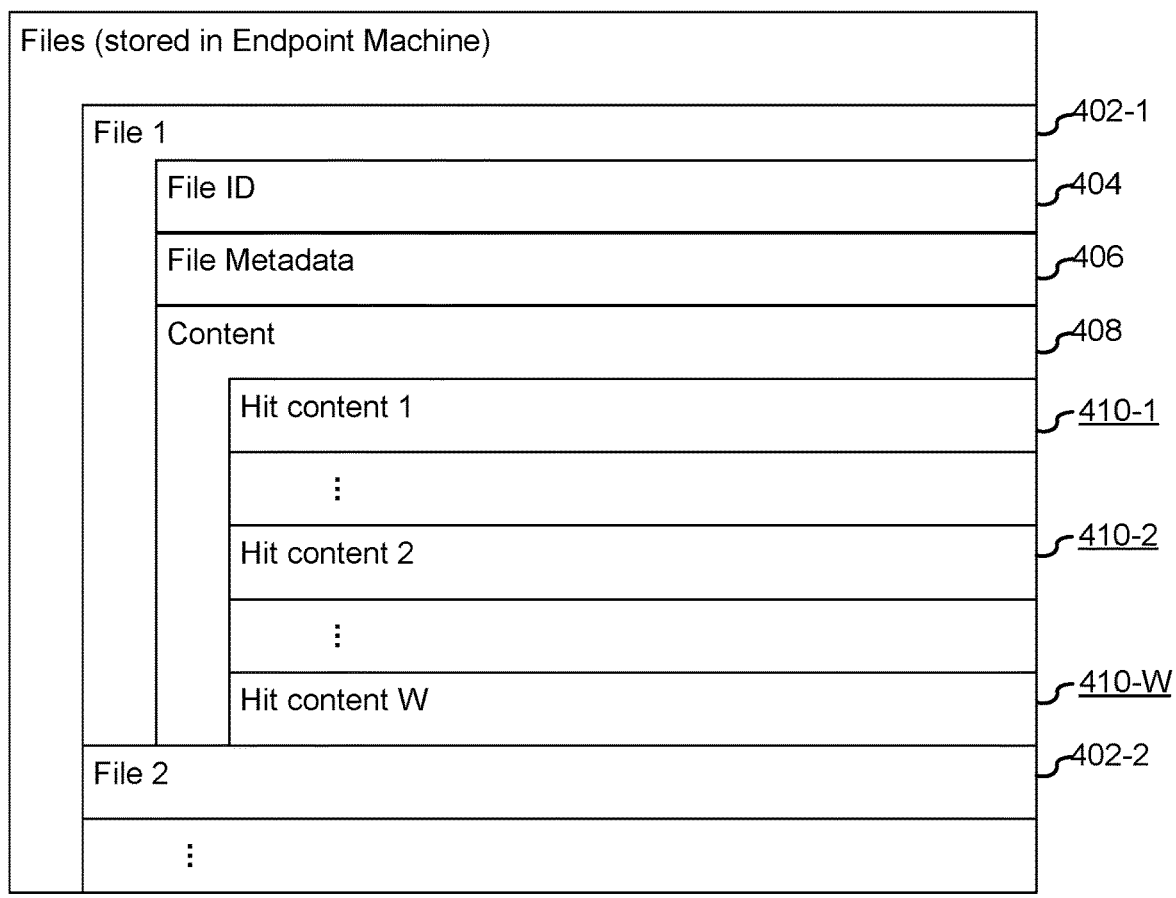
FIGS. 4A and 4B illustrate examples of file information, including content and context, in accordance with some embodiments.
Figure 4B:
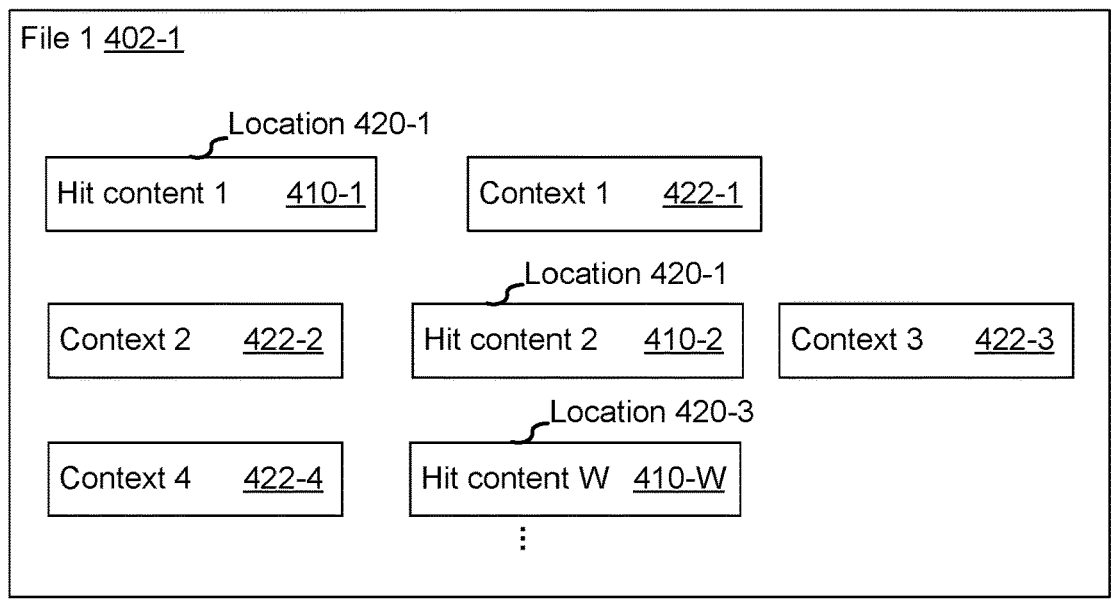

FIGS. 4A and 4B illustrate example contents of files 402 stored at endpoint machine 102. As shown in FIG. 4A, the information regarding any one file (e.g., file 402-1) that is identified as satisfying at least one rule in the set of one or more rules includes at least the following: file ID 404, file metadata 406, and content 408, where content 408 includes one or more sets of content herein called hit content 410 (e.g., 410-1 to 410-W), where each hit content contributes towards file 402 satisfying a respective rule. As shown in the schema in FIG. 4B, for file 402-1, additional information regarding hit content 410 is available in some embodiments. For example, hit content information for a particular instance of hit content may include the location 420 (e.g., an offset from the beginning of the file) of the hit content within the file and context information 422 (e.g., text adjacent to the instance of hit content). In some embodiments, context for an instance of hit content is located after the hit content (e.g., context 422-1 is located on the same line (or in the same field, or a neighboring field) of file 402-1 as hit content 410-1, after hit content 410-1). In some embodiments, context for an instance of hit content is located before the hit content (e.g., context 422-4 is located on the same line (or in the same field, or a neighboring field) as hit content 410-W, before hit content 410-W). In some embodiments, context is located both before and after an instance of hit context (e.g., context 422-2 is located on the same line as hit content 410-2, before hit content 410-2, and 422-3 is located on the same line (or the same field, or a neighboring field) as hit content 410-2, after hit context 410-2). In some embodiments (not shown), context may be on a different line, or in a different field, of the file than the hit context. In some embodiments, context of hit content contributes to satisfying a respective rule (e.g., in some embodiments, the context is evaluated with regards to a validation rule 216 or with regards to a filter 210 of a respective rule 204).

FIGS. 5A-5C illustrates example reports. In FIG. 5A, an example first report 502 is shown. A first report identifies, for each rule 506 in the set of one or more rules, for each machine 504 in a set of machines that has evaluated the set of one or more rules, a count of files 508 that contain file content at that machine that satisfies the respective rule 506. In some embodiments, the first report 502 also includes additional information such as the total number of matches (e.g., hits) at each machine for each rule 510 and also an indicator 512 of scan process (e.g., whether a respective machine has finished evaluating a respective rule).

FIG. 5B provides an example of a second report 520, which is sent by a respective machine to a respective server or an external machine (e.g., an external server 110). In some embodiments, the second report 520 is sent by the respective machine to the respective server or external machine via a direct duplex connection, as described elsewhere in this document. Second report 520 includes file identifying information 522 identifying files at the respective machine that contain file content satisfying a respective rule in the set of one or more rules. For example, a user or administrator of the external machine may select a row in the first report, thereby identifying both an endpoint machine and a rule, and in response receive an instance of the second report 520 for that machine and rule. In some embodiments, the second report further includes, for each file identified in the second report, a count 524 of content that satisfies the respective rule in the set of one or more rules. In some embodiments, the second report further includes file metadata 526 for each identified file.

FIG. 5C provides an example of an example of a third report 540, which is sent by a respective machine to a respective server or an external machine (e.g., an external server) via a direct duplex connection. Third report includes file snippets 542 identified as containing file content satisfying a respective rule in the set of one or more rules. In some embodiments, third report 540 also includes an indication 544 of whether a respective file snippet 542 has been positively identified as satisfying a respective rule (e.g., whether the file snippet satisfies a validation rule of the respective rule). In some embodiments, the third report 540 is produced by the respective machine, and sent to the respective server or external machine, in response to a user or administrator of the respective server or external machine selecting a row in the second report, thereby identifying an endpoint machine, a rule, and a file.

FIGS. 6A-6C illustrates example quick search reports, which are produced in response to so-called quick queries or quick search queries. In FIG. 6A, an example first quick search report 602 is shown. A quick search query typically comprises one rule (i.e., a single rule) that is sent to a targeted set of endpoint machines in a query. For example, a quick search query may identify a text string, represented by a sequence of hashed tokens (see discussion of FIG. 3), and comprise a request for information about files at endpoint machines that contain the text string. In response to the quick search query, the endpoint machines to which the quick search query is sent evaluate the query to produce a set of search results. As described above, queries can specify the endpoint machines at which they are to be processed, for example by specifying one or more filters indicating specific endpoint machines, and/or the types of endpoint machines, and/or other characteristics of endpoint machines, at which the query is to be processed. Typically, evaluation of the quick search query at each endpoint machine requires multiple lookup operations in the endpoint machine's reverse index to determine which files, if any, match the quick search query. Depending on the complexity of the quick search query, the quick search query may be configured to immediately load the results into a payload portion of the quick search query before passing the quick search query to a next machine in the linear communication orbit, or, alternatively, the quick search query may be configured to have each endpoint machine immediately pass the quick search query to a next machine in the linear communication orbit and locally store the query evaluation results so that the query evaluation results can be picked up by a second query, sometimes called a results collection query, typically sent to the endpoint machines anywhere from one second to a minute after the quick search query that contains the rule to be evaluated is sent to the endpoint machines. In the latter case, the "quick search query" is actually a pair of queries, sent in quick succession. In some embodiments, the first quick search report 602 identifies, for each machine 604 from which search results are received (or, alternatively, for each machine 604 which reports finding at least one file satisfying the quick search), a count of files 606 that contain file content at said machine that satisfies the rule. In some embodiments, the first report 502 also includes additional information such an indicator 608 of scan progress (e.g., whether a respective machine has finished evaluating the rule/quick search).

FIG. 6B provides an example of a second quick search report 620, which is sent by a respective machine to a respective server or an external machine (e.g., an external server 110) via a direct duplex connection. Second quick search report 620 includes file identifying information 622 identifying files at the respective machine that contain file content satisfying the quick search. In some embodiments, the second report further includes, for each file identified in the second report, a count of content 624 that satisfies the rule/quick search. In some embodiments, the second report further includes file metadata 626 for each identified file.

FIG. 6C provides an example of a third quick search report 640, which is sent by a respective machine to a respective server or an external machine (e.g., an external server) via a direct duplex connection. Third quick search report includes file snippets 642 identified as containing file content satisfying the rule/quick search. In some embodiments, third quick search report 640 also includes the location of each snippet 644.

FIG. 7 is a block diagram of an exemplary endpoint machine 102 as shown in FIGS. 1A and 1B. In some embodiments, endpoint machine 102 includes one or more processors 702, memory (e.g., persistent memory 703 and non-persistent memory 704) for storing programs and instructions for execution by the one or more processors 702, one or more communications interfaces such as input/output interface 706 and network interface 708, and one or more communications buses 710 for interconnecting these components.

In some embodiments, input/output interface 706 includes a display and input devices such as a keyboard, a mouse, or a track-pad. However, in some embodiments, endpoint machine 102 does not include an input/output interface 706. In some embodiments, communication buses 710 include circuitry (sometimes called a chipset) that interconnects and controls communications between system components. In some embodiments, non-persistent memory 704 includes high-speed random-access memory, such as DRAM, SRAM, DDR RAM or other random-access solid-state memory devices. In some embodiments, persistent memory 703 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid-state storage devices. In some embodiments, persistent memory 703 optionally includes one or more storage devices remotely located from the one or more processors 702. In some embodiments, persistent memory 703 and/or the non-volatile memory device(s) within the non-persistent memory 704 comprises a non-transitory computer readable storage medium.

In some embodiments, memory 704 or alternatively the non-transitory computer readable storage medium stores the following programs, modules and data structures, instructions, or a subset thereof:

Operating System 712 that includes procedures for handling various basic system services and for performing hardware dependent tasks.

Optionally, I/O module 714 that includes procedures for handling various basic input and output functions through one or more input and output devices.

Communication module 716, which includes:

LCO communications module 718 that includes instructions for (1) connecting machine 102 to other machines (e.g., other machines 102 in network 100) in the same linear communication orbit 106 (FIGS. 1A, 1B) as machine 102, and (2) handling receipt, processing, propagation, collection and reporting of system, security and network management messages and commands, and/or distribution of files and software updates via the linear communication orbit.

Direct connection module 720 that includes instructions to establish a direct full duplex connection with an external machine, such as server 110, in response to an instruction packet received by machine 102 via the linear communication orbit.

Non-LCO communications module 722 that includes instructions for connecting machine 102 to servers (e.g., server 108) via one or more network communication interfaces 708 (wired or wireless) and one or more communication networks, such as the Internet, other wide area networks, local area networks, metropolitan area networks, and so on.

Orbit formation and maintenance module 724 that includes instructions to self-insert machine 102 into a linear communication orbit, self-heal from a broken link in the linear communication orbit, and maintain the linear communication orbit for network and system management.

Query/Command and Response Module 726 that includes instructions for processing data requests and other commands received from a preceding machine, succeeding machine, server, or other external machine.

Local rules database 728 (e.g., corresponding to local database 202, shown in FIG. 2) that includes a local copy of each of the rules sent to endpoint machine 102 by a respective server, and includes rule evaluation results generated by rule evaluation module 732, as discussed above with reference to FIG. 2.

Rule evaluation module 732 that includes instructions or submodules for rule evaluation 734, for generating a first report 736 regarding files that satisfy each of the rules, a second report 738 files that satisfy each of the rules, and a third report 740 regarding hits within a file that satisfies a respective rules in the set of rules, and any subsequent reports regarding files that satisfy respective rules in the set of rules.

Reverse index 744 (e.g., corresponding to reverse index 302, shown in FIG. 3) that provides a lookup table for identifying files that contain text matching the text specified by a rule or search query, as discussed above with reference to FIG. 3.

Reverse index module 746 that includes instructions generating and updating reverse index 744 as files are added, removed and updated at the endpoint machine 102, as well as instructions for searching and extracting information from reverse index 744.

Quick search module 748 that includes instructions for performing a quick-search of files stored at the endpoint machine 102 (e.g., to produce reports as shown in FIGS. 6A-6C).

Background processing module 750 that includes instructions for performing rule evaluation (using rule evaluation module 732) as a background task or process, and generating and updating reverse index 744 (using reverse index module 746) as a background task or process. These background tasks or processes are executed while endpoint machine 102 continues to perform its primary functions (execution of other modules 756).

Snippet report module 752 that includes instructions for sending one or more snippets (e.g., file content satisfying a respective rule in the set of one or more rules) to a server or external machine through a direct duplex connection.

Resource usage manager 753, for monitoring and limiting resource usage (e.g., usage of one or more processors, disk storage devices, main memory, disk I/O, etc.) so as to limit the impact of certain operations, such as those performed by one or more of reverse index module 746, rule evaluation module 732, quick search module 748, and background processing module 750, on the normal or business critical operations of the endpoint machine, represented by other modules 756.

Local data 754 such as messages, files (e.g., as shown in FIGS. 4A and 4B), reports (e.g., as shown in FIGS. 5A-5C and 6A-6C), and/or other information (e.g., file identifying information) that is stored locally (e.g., in a local database of machine 102), temporarily or otherwise; in some embodiments or circumstances, portions of local data 754 is stored upon receipt from a preceding machine, succeeding machine, server, or external machine; in some embodiments or circumstances, portions of local data 754 is locally generated, revised or supplemented by machine 102; and in some embodiments or circumstances, portions of local data 754 is transmitted by machine to a preceding machine, succeeding machine, server, or external machine.

Optionally, other modules 756 that include instructions for handling other functions and aspects described herein, such as creation and maintenance of local event logs and performing IOC evaluations based on local state.

FIG. 7 is merely illustrative of the structures of machines 102. A person skilled in the art would recognize that particular embodiments of machines 102 may include more or fewer components than those shown. One or more modules may be divided into sub-modules, and/or one or more functions may be provided by different modules than those shown.

Privacy protections. The evaluation of rules, generation of snippets, and the use of direct duplex connections by administration machines 116 to endpoint machines 102, as described above, provide operators with the ability to search or view content on any endpoint machine which includes these features. In some embodiments, to facilitate responsible operation of such capabilities, only administrator machines with explicitly installed permissions are able to submit rules to endpoint machines, transmit queries to endpoint machines, and view content at endpoint machines through the use of direct duplex connections. For example, in some embodiments, endpoint machines are configured to reject rules, queries and direct duplex connection requests from administrator machines lacking credentials meeting predefined criteria.

Endpoint Resource Management. In some embodiments, a resource usage manager (e.g., resource usage manager 753, FIG. 7) at the endpoint machine 102 limits resource usage by a set of one or more search modules, including the reverse index module 746, so that the set of search modules does not interfere with the normal operations and/or critical business functions, of the endpoint machine 102. In some embodiments, the set of search modules includes the reverse index module 746 as well as the rule evaluation module 732, quick search module 748, background processing module 750, snippet report module 752, and optionally other modules such as the query/command and response module 726. In some embodiments, to control the impact of the set of search modules on normal operations of the endpoint machine 102, the set of search modules (including the reverse index module 746) is configured to do one or more of the following: run at low CPU priority, impose limits on its usage of local compute resources, impose limits on its usage of memory resources, impose limits on its usage of disk I/O, and impose limits on its usage of storage resources. In some embodiments, the set of search modules at different endpoint machines can be configured to have different resource limits, based on both the resources available at those endpoint machines and the resource needs of other modules and applications executed by those endpoint machines.

In some embodiments, the set of search modules limit (e.g., via resource usage manager 753) their compute usage to a configurable fraction of the computational resources of a single local processor core. For example, in some embodiments, a CPU usage limit of in the range of 3 percent to 15 percent (e.g., 3 percent, 5 percent, or 10 percent) is imposed on the set of search modules of a respective endpoint machine to prevent the set of search modules from interfering with the normal operations of the endpoint machine. In some embodiments, the compute usage limit is enforced using a look-behind throttle in which it performs an atomic unit of work and then sleeps for a throttle balance, the duration of time required to bring it into compliance with the usage limit.

In some embodiments, disk reads and writes are limited in terms of a maximum data size, sometimes called a maximum read/write size. Large operations are broken up into operations no larger than the maximum read/write size and queued. In some embodiments, other measures used by the set of search modules to limit disk reads and writes include one or more of: not retaining file handles between operations; reading user files as a unidirectional stream, so that each bit in the user files is read at most once. Additionally, in some embodiments, user files are never modified or deleted by the set of search modules, and all of the persistent data generated by the set of search modules adheres to a write once paradigm, meaning existing files generated by the set of search modules are not modified.

In some embodiments, the set of search modules limit memory usage by imposing caps on the amount of working memory used during content extraction as well as the total amount of content that is extracted per file. If either of these limits is reached when processing a file at the endpoint machine, sometimes called a user file, the relevant module (e.g., the reverse index module 746 or rule evaluation module 732 or quick search module 748) will process with as much content as is available without exceeding any of the applicable resource usage limits, and optionally records that the file was too large to process fully. For example, the reverse index module 746 can be configured to extract no more than a predefined amount of data, such as 32 megabytes (32 MB) of data, from any one file that it is indexing, or to limit the amount of main memory (e.g., random access memory) that the reverse index module 746 can use to extract content from a file to a specified amount of memory (e.g., a limit of 32 MB). In some embodiments, the reverse index module 746 or the set of search modules are configured to limit the number of files to be scanned (e.g., a limit of 100,000) with each run of the reverse index module 746, and/or are configured to limit the number of previously indexed files to be re-scanned (e.g., a limit of 10,000) with each run of the reverse index module 746, and to set or limit the frequency at which the reverse index module 746 is executed to a specified rate (e.g., a specified rate, or limit, of once per minute).

In some embodiments, the set of search modules, or a respective module such as the reverse index module 746) at each endpoint machine monitors the total footprint of their data at rest on the local drive on which it is installed, and monitors the available space on that drive. In some embodiments, the reverse index module 746 is configured not to index additional data unless there is at least a configured (e.g., preset or specified) minimum amount space available (e.g., 2 gigabytes) on the local drive. In some embodiments, if a size of the reverse index 744 is found to exceed a separate configured limit (e.g., 1 gigabyte), document records are removed from the reverse index 744 until the footprint of the reverse index 744 is in compliance with the configured limit. In some embodiments, incidents in which any resource limit is exceeded, or processing is halted or limited when a resource limit is reached, by operation of the set of search modules, are recorded as events in a local event database, and are reported to a server or administer machine in response to a query requesting information about such incidents.

To ensure a reasonable balance between limiting the impact of the set of search modules on normal operations, and being able to adequately index all files at the endpoint machines, various tests have been performed to determine resource limits that are consistent with predefined file indexing performance goals, such as generating a complete reverse index within a predefined number of hours (e.g., a target number of hours between 4 hours and 24 hours), and being able to re-index up to a predefined number files per hour (e.g., a target re-indexing rate between 1000 and 50,000 files per hour) whose content has changed. In some embodiments, applicable resource limits consistent with the indexing performance goals are determined for a plurality of different types of endpoint machines, and then endpoint machines of those types are configured with the determined resource limits.

In some embodiments, tests are also performed, on a variety of types of endpoint machines, to determine the resources needed to meet predefined query response time goals (e.g., obtaining query results for both rule-based queries and quick queries, from at least 99% of endpoint machines in a linear communication orbit within one minute of the query being received by all of the endpoint machines to which the query is targeted or applicable) and then endpoint machines of those types are configured with resource limits based (e.g., determined) at least in part on the resources determined to be needed to meet the predefined query response time goals. In some embodiments, endpoint machines are configured with resource limits based (e.g., determined) at least in part on resources determined to be needed to meet the predefined query response time goals and on resources determined to be needed to meet the predefined file indexing performance goals.

FIG. 8 is a block diagram of an exemplary computer system 108, sometimes called server 108, or server system 108 (e.g., server 108 of the networks shown in FIGS. 1A and 1B). In some embodiments, server 108 includes one or more processors 802, memory (e.g., persistent memory 803 and non-persistent memory 804) for storing programs and instructions for execution by one or more processors 802, one or more communications interfaces such as input/output interface 806 and network interface 808, and one or more communications buses 810 for interconnecting these components. In some embodiments, the one or more communication interfaces couple server 108 to, and enable communications with machines in a non-static collection of machines (e.g., machines 102, FIGS. 1A and 1). More specifically, in some embodiments, the one or more communication interfaces, such as network interface 408, couple server 108 to one or more linear communication orbits (e.g., LCOs 106, FIGS. 1A and 1B).

In some embodiments, input/output interface 806 includes a display and input devices such as a keyboard, a mouse, or a track-pad. However, in some embodiments, server system 108 does not include an input/output interface 806. In some embodiments, communication buses 810 include circuitry (sometimes called a chipset) that interconnects and controls communications between system components. In some embodiments, non-persistent memory 804 includes high-speed random access memory, such as DRAM, SRAM, DDR RAM or other random access solid state memory devices. In some embodiments, persistent memory 803 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 803 optionally includes one or more storage devices remotely located from the one or more processors 802. In some embodiments, persistent memory 803 and/or the non-volatile memory device(s) within the non-persistent memory 804 comprises a non-transitory computer readable storage medium.

In some embodiments, memory 804, or alternatively the non-transitory computer readable storage medium, stores the following programs, modules, data structures, instructions, or a subset thereof:

- Operating System 812 that includes procedures for handling various basic system services and for performing hardware dependent tasks.
- Optionally, I/O module 814 that includes procedures for handling various basic input and output functions through one or more input and output devices.
- Communication module 816, which comprises:
  - LCO communications module 818 that includes instructions for (1) connecting server 108 to other machines (e.g., other machines 102 in network 100) in one or more linear communication orbits 106 (FIGS. 1A, 1B) connected to and serviced by server 108, (2) handling receipt, processing, propagation, collection and reporting of system, security and network management messages and commands via the one or more linear communication orbits connected to and serviced by server 108, and/or distribution of files and software updates.
  - Direct connection module 820 that includes instructions for sending an instruction packet to a specified machine 102 on a linear communication orbit, instructing that machine 102 to initiate an outbound connection to an external machine (e.g., server 108 or server 110), establishing a direct full duplex connection between the specified machine 102 and the external machine, which can then be used by the external machine to inspect and update machine 102.
  - Non-LCO communications module 822 that includes instructions for connecting server 108 to other machines, such as other servers 108 or 110, administrator machine(s) 116, etc., via one or more network communication interfaces 408 (wired or wireless) and one or more communication networks, such as the Internet, other wide area networks, local area networks, metropolitan area networks, and so on.
- Orbit formation and maintenance module 824 that includes instructions to determine and provide ordinal positions of machines 102 in an ordered sequence of a set of managed machines currently known to be coupled to network 100; and optionally includes instructions for a machine to self-insert into a linear communication orbit, self-heal from a broken link in the linear communication orbit, and maintain the linear communication orbit for network and system management.
- Query/Command and response module 826 that includes instructions for sending rules and queries to one or more machines in one or more linear communication orbits, retrieving results and query responses, and sending said results and responses to an analysis module, such as analysis module 840, discussed below. In some embodiments, query/command and response module 826 provides a user interface for a network or system administrator to directly perform various system and network functions, such as sending out rules and/or queries.
- Rule authoring module 828 that includes instructions for composing rules, including rule components such as primary rules (e.g., regular expressions), validation rules, and optionally executable code (e.g., executable code 214, shown in FIG. 2). In some embodiments, rule authoring module 828 provides a user interface for a network or system administrator to directly determine rule contents.
- Rules 830 (e.g., a local copy of the set of one or more rules), that includes each rule (e.g., rules 832-1, 832-2, 832-M, etc.) propagated from a network server and/or an external machine through a linear communication network.
- Quick search module 834 that includes instructions for initiating a quick-search of files at one or more endpoint machines in one or more linear communication orbits (e.g., to procure the reports shown in FIGS. 6A-6C). In some embodiments, quick search module 834 provides a user interface for a network or system administrator to directly perform quick searches.
- Aggregated report generation module 836 that includes instructions for collecting and compiling one or more first reports, one or more second reports, and/or one or more query responses from one or more machines in one or more linear communication orbits (e.g., collecting data from one or more linear communication orbits).
- Snippet report module 838 that includes instructions for collecting one or more snippets (e.g., file content satisfying a respective rule in the set of one or more rules) from a machine 102 through a direct duplex connection.
- Analysis module 840 that includes instructions for analyzing raw data items collected from one or more linear communication orbits, organizing the raw data items and/or derived data items (i.e., result data from the analysis), and storing result data from the analysis of the collected raw data items in local data 842.
- Local data 842 such as messages, files, reports and/or other information (e.g., for storing result data that has been analyzed after transmission from machines in one or more linear communication orbits) that is stored, temporarily or otherwise, upon receipt from other machines, and/or that is locally generated, revised, or supplemented.
- Optionally, other modules 844, including function modules, that include instructions for handling other functions and aspects described herein, such as creation and maintenance of local event logs and performing IOC evaluations based on local state.

FIG. 8 is merely illustrative of the structures of server 108 or 110. A person skilled in the art would recognize that particular embodiments of server 108, for example, may include more or fewer components than those shown. One or more modules may be divided into sub-modules, and/or one or more functions may be provided by different modules than those shown.

FIG. 9 is a block diagram of an exemplary computer system 116, such as an administrator machine of the network shown in FIG. 1. In some embodiments, administrator machine 116 includes one or more processors 902, memory (e.g., persistent memory 903 and non-persistent memory 904) for storing programs and instructions for execution by one or more processors 902, one or more communications interfaces such as input/output interface 906 and network interface 908, and one or more communications buses 910 for interconnecting these components.

In some embodiments, input/output interface 906 includes a display and input devices such as a keyboard, a mouse, or a track-pad. However, in some embodiments, administrator machine 116 does not include an input/output interface 906.

In some embodiments, communication buses 910 include circuitry (sometimes called a chipset) that interconnects and controls communications between system components. In some embodiments, non-persistent memory 904 includes high-speed random access memory, such as DRAM, SRAM, DDR RAM or other random access solid state memory devices. In some embodiments, persistent memory 903 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 903 optionally includes one or more storage devices remotely located from the one or more processors 902. In some embodiments, persistent memory 903 and/or the non-volatile memory device(s) within the non-persistent memory 904, comprises non-transitory computer readable storage medium.

In some embodiments, memory 904, or alternatively the non-transitory computer readable storage medium, stores the following programs, modules, data structures, instructions, or a subset thereof:

Operating System 912 that includes procedures for handling various basic system services of administrator machine 116 and for performing hardware dependent tasks.

Optionally, I/O module 914 that includes procedures for handling various basic input and output functions through one or more input and output devices.

Communication module 916, which comprises:

Direct connection module 920 that includes instructions for sending an instruction packet, via a server 108, to an endpoint machine 108, instructing the endpoint machine to initiate an outbound connection to administrator machine 116 (or another external machine such as server 110), establishing a direct full duplex connection with administrator machine 116 or other external machine.

Non-LCO communications module 922 that includes instructions for handling communications between administrator machine 116 and other machines, such as server 108, via one or more network communication interfaces 908 (wired or wireless) and one or more communication networks, such as the Internet, other wide area networks, local area networks, metropolitan area networks, and so on.

Query/Command and response module 926 that includes instructions for sending rules and queries to one or more machines in one or more linear communication orbits, retrieving results and query responses, and sending said results and responses to analysis module 940. In some embodiments, query/command and response module 926 provides a user interface for a network or system administrator to directly perform various system and network functions, such as sending out rules and/or queries.

Rule authoring module 928 that includes instructions for composing rules, including rule components such as primary rules (e.g., regular expressions), optionally validation rules, and optionally executable code (e.g., as shown in FIG. 2). In some embodiments, rule authoring module 928 provides a user interface for a network or system administrator to directly determine rule contents.

Rules 930 (e.g., a local copy of the set of one or more rules), that includes each rule (e.g., rules 932-1, 932-2, 932-M, etc.) propagated from a network server and/or an external machine through a linear communication network.

Quick search module 934 that includes instructions for performing a quick-search of files at one or more endpoint machines in one or more linear communication orbits (e.g., to procure the reports shown in FIGS. 6A-6C). In some embodiments, quick search module 934 provides a user interface for a network or system administrator to directly perform quick searches.

Aggregated report generation module 936 that includes instructions for collecting and compiling one or more first reports, one or more second reports, and/or one or more query responses from one or more machines in one or more linear communication orbits (e.g., collecting data from one or more linear communication orbits).

Snippet report module 938 that includes instructions for collecting one or more snippets (e.g., file content satisfying a respective rule in the set of one or more rules) from a machine 102 through a direct duplex connection.

Analysis module 940 that includes instructions for analyzing raw data items collected from one or more linear communication orbits, organizing the raw data items and/or derived data items (i.e., result data from the analysis), and storing result data from the analysis of the collected raw data items in local data 942.

Local data 942 such as messages, files, reports and/or other information (e.g., for storing result data that has been analyzed after transmission from machines in one or more linear communication orbits) that is stored, temporarily or otherwise, upon receipt from other machines, and/or that is locally generated, revised, or supplemented.

Optionally, other modules 944, including function modules, that include instructions for handling other functions and aspects described herein, such as creation and maintenance of local event logs and performing IOC evaluations based on local state.

FIG. 9 is merely illustrative of the structures of server 108 or 110. A person skilled in the art would recognize that particular embodiments of server 108, for example, may include more or fewer components than those shown. One or more modules may be divided into sub-modules, and/or one or more functions may be provided by different modules than those shown.

Figure 10:
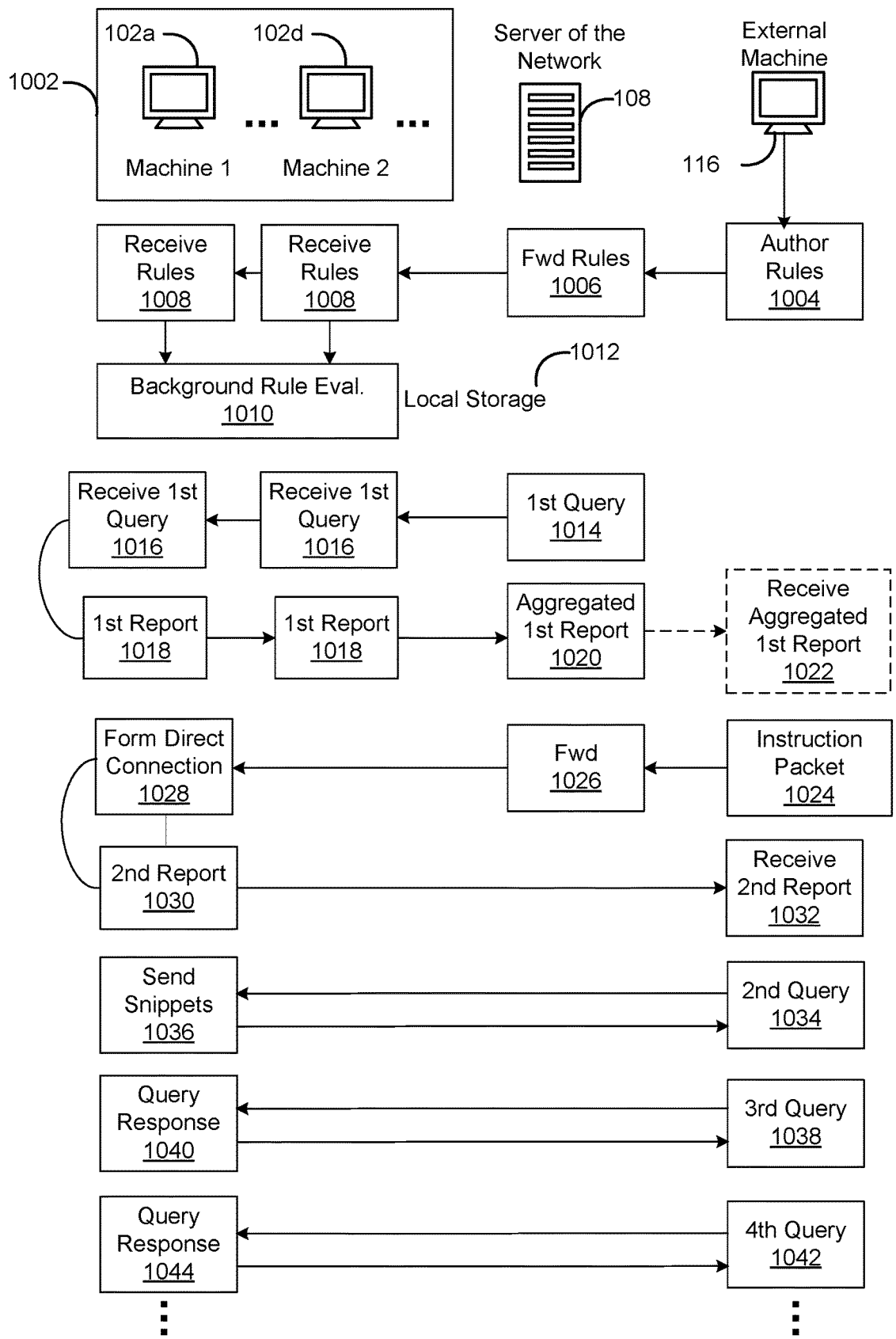
FIG. 10 is a flow chart of a method of report generation and transmission (e.g., by an exemplary endpoint machine) to a requesting server or other external machine, in accordance with some embodiments.

FIG. 10 illustrates a flow diagram of a method of monitoring a network that includes a non-static collection of machines. The non-static collection of machines includes a linear communication orbit. In some embodiments, before the method is performed, a set of one or more rules are authored (1004) and forwarded (1006) to at least some of the machines 1002 in the non-static collection of machines. In some embodiments, the set of one or more rules are authored at a machine external to the linear communication orbit (e.g., administrator machine 116 or external server 110) and forwarded by a server of the network (e.g., server 108) to respective machines in the collection of machines. In some embodiments, the set of one or more rules are both authored and forwarded to the collection of machines by a server, such as server 108 (FIGS. 1A, 1B) of the network. Each endpoint machine (e.g., 102a, 102d, etc.) in the collection of machines receives (1008) the set of one or more rules and performs a background evaluation of the rules in the set of one or more rules (1010). In some embodiments, the background rule evaluation occurs as described above with reference to background processing module 750 (FIG. 7), and the results for the background rule evaluation at each machine are stored in a local database 1012 at the respective machine.

At a first time, a respective machine 102a in the collection of machines 1002 receives (1016) a first query through the linear communication orbit, wherein the first query has been propagated (1014) from a respective server (e.g., server 108) to the respective machine though one or more upstream machines (e.g., machines that are upstream of the respective machine 102a) along the linear communication orbit. When the first query is a request for results corresponding to one or more of the rules previously provided to endpoint machines in the collection of machines 1002, the first query identifies the rules for which results are requested. In some embodiments, the first query identifies a subset of the set of rules previously provided to the endpoint machines to which the first query is directed. Typically, the first query is received (at the first time) after the set of one or more rules has been forwarded (1006) to the respective machine 102a, and the respective machine 102a has evaluated the one or more rules (1010).

In response to receiving the first query, the respective machine, for each respective rule in the set of one or more rules, identifies files (if any) that contain file content that satisfies the respective rule. In some embodiments, information identifying files that contain file content that satisfy each respective rule is determined by the background rule evaluation 1010 and locally stored, so that those rule evaluation results are available for fast retrieval, for example in response to the first query. Subsequent to receiving the first query, the respective machine generates (1018) a first report identifying, for each rule in the set of one or more rules, a count of files at the respective machine that contain file content satisfying the rule, and sends (1020) the first report through the linear communication orbit to the respective server via an end machine (e.g., at an end machine) of the linear communication orbit.

In some embodiments, the purpose of the first query 1014 is to obtain evaluation results for a quick search query. As discussed above with reference to FIGS. 6A-6C, in some embodiments, a quick search is implemented as a set of two queries (e.g., a quick search query, which specifies a rule to be evaluated, and a results collection query) sent in quick succession. In that case, the "first query 1014" is the results collection query, sent to the endpoint machines after a quick search query is sent to those machines, and generation 1018 of the first report is in response to the results collection query. The quick search query, which is sent to the endpoint machines prior to the results collection query, and its evaluation at the endpoint machines corresponds to operations 1006, 1008 and 1010 in FIG. 10, except that the evaluation of the rule in the quick search query is typically performed with higher priority than the background rule evaluation for rules that are retained and periodically reevaluated by the endpoint machines.

In some embodiments, the respective machine sends the first report by adding the first report to a payload portion of the first query, and then forwarding the first query to a next downstream machine in the same linear communication orbit 1002 as the respective machine. In some embodiments, the end machine aggregates all the first reports from machines in the linear communication orbit 1002, and sends that aggregated report to the respective server. In some embodiments, the respective server itself aggregates the first reports from the machines in the linear communication orbit. In some embodiments, the respective server forwards (1022) the aggregated report to an external machine, such as external machine 116. As described above with respect to FIG. 2, in some embodiments the information included in the first report is computed by the respective machine, and stored in a local database 202 of the respective machine, using background processing, prior to receiving the first query.

By evaluating rules or queries in parallel at the endpoint machines, without having to send any underlying data to servers for evaluation, and then collecting the evaluation results in the form of aggregated reports produced by the endpoint machines, responses to rule evaluation requests or queries can be obtained from a very large number of endpoint machines (e.g., thousands of endpoint machines) in a very short amount of time (e.g., an amount of time that is five minutes or less, such as one minute, or two minutes, from the time at which a rule evaluation query is sent to the endpoint machines by a server).

At a second time, subsequent to the first time, the respective machine receives (1028) from an external machine, external to the linear communication orbit, an instruction packet 1024 (e.g., corresponding to instruction packet 122 in FIG. 1B) via the linear communication orbit. In some embodiments, the external machine is the respective server. The instruction packet 1024 is propagated (1026, e.g., forwarded by server 108) to the respective machine through one or more upstream machines along the linear communication orbit. In some embodiments, the instruction packet includes an instruction for establishing a direct duplex connection between the respective machine and the external machine. In response to receiving the instruction packet through the linear communication orbit, the respective machine forms the direct duplex connection by sending an outbound connection request to the external machine to establish the direct duplex connection between the respective machine and the external machine in accordance with a respective network connection protocol.

After the direct duplex connection has been established, the respective machine sends (1030) a second report (e.g., 502 in FIG. 5A or 602 in FIG. 6A) to the external machine via the direct duplex connection. In some embodiments, the second report is sent by the respective machine in response to a query (not shown) sent by the external machine via the direct duplex connection. The second report includes, as described in FIGS. 5B and 6B, file identifying information identifying files at the respective machine that contain file content satisfying each rule in the set of one or more rules. In some embodiments, the second report further includes, for each file identified in the second report, a count of content portions that satisfy a respective rule in the set of one or more rules. As described above with respect to FIG. 2, in some embodiments the information included in the second report is computed by the respective machine, and stored in a local database 202 of the respective machine using background processing, prior to receiving a query for the second report.

The respective machine receives (1034), at a third time subsequent to the second time, a second query through the direct duplex connection from the external machine. The second query includes one or more requests for snippets of information from a respective file identified as containing file content satisfying a respective rule in the set of one or more rules. In response to receiving the second query, the respective machine sends (1036) to the external machine via the duplex direct connection a third report including one or more snippets corresponding to file content in the respective file that contributes to satisfaction of the respective rule (e.g., as described in FIGS. 5C and 6C). In some embodiments, for each snippet included in the third report, context information, comprising text adjacent the snippet, preceding and/or following the snippet in the file, is included along with the text of the snippet.

In some embodiments, the third report includes snippet information identifying, for the respective file (e.g., for each file), locations in the respective file corresponding to the file content that contributes to satisfaction of the respective rule, as well as the snippets of file content. In some embodiments, the locations in the respective file corresponding to the file content that contributes to satisfaction of the respective rule are determined by the endpoint machine during background process, and are stored in a local database (see local database 202, FIG. 2) along with other results of evaluating the one or more rules in the set of rules, as described above with reference to FIG. 2.

In some embodiments, the direct duplex connection used for the second and third reports is an encrypted communication connection in which information sent by the respective machine to the external machine is encrypted. (e.g., to protect confidential information).

With regard to quick searches (e.g., as described with regard to FIGS. 6A-6C), variations in the reports are described below. The first query includes a single rule, the single rule specifying a string, represented by a sequence of hashed tokens, each hashed token corresponding to a predefined unit of text. Each of the hashed tokens comprises a result of applying a predefined one-way hash function to a corresponding token. The first report includes information corresponding to a count of files at the respective machine that contain file content matching the string specified by the single rule. In some embodiments, identifying files that contain file content that satisfies the single rule includes performing lookups, in a reverse lookup table (e.g., as shown in FIG. 3), of the hashed tokens in the sequence of hashed tokens, to identify files having content matching units of text in the string specified by the single rule. Further discussion of identifying files matching a quick search is provided above with reference to FIG. 3.

In some embodiments, as shown in FIG. 2, each rule in the set of one or more rules includes a primary rule, and a respective rule in the set of one or more rules includes one or more validation rules that are logically combined with the primary rule of the respective rule to determine whether respective file content (e.g., one or more hits in the respective file) satisfies the respective rule.

In some embodiments, the primary rule of each rule in the set of one or more rules corresponds to a respective regular expression (e.g. a content pattern). In some embodiments, each validation rule in the set of one or more validation rules corresponds to a respective second regular expression.

Each rule optionally includes validation rules (e.g., validation rules 216 in FIG. 2), and each validation rule can be either a positive or negative validation rule, for confirming and negating the applicability of a rule to a particular content item in a file. Thus, some rules may include one or more validation rules, while one or more rules may include no validation rules.

In some embodiments, the one or more validation rules of a respective rule include one or more positive validation rules. In some embodiments, determining whether a respective file satisfies the respective rule includes determining a number of hits in the respective file. When a respective rule includes one or more positive validation rules, each hit corresponds to file content in the respective file that satisfies both the primary rule of the respective rule and at least one positive validation rule of the respective rule. Stated another way, in some embodiments, determining whether a respective file satisfies the respective rule includes determining whether file content within the respective file satisfies at least one positive validation rule in the one or more positive validation rules.

In some embodiments, the one or more validation rules of the respective rule include one or more negative validation rules. In some embodiments, determining whether a respective file satisfies the respective rule includes determining a number of hits in the respective file. When a respective rule includes one or more negative validation rules, each hit corresponds to file content in the respective file that satisfies the primary rule of the respective rule and does not satisfy any negative validation rule in the one or more negative validation rules of the respective rule. Stated another way, in some embodiments, the method includes determining whether a respective file does not satisfy the respective rule, including determining whether file content within the respective file satisfies at least one negative validation rule in the one or more negative validation rules.

In some embodiments, positive validation rules have higher priority, or outrank, negative validation rules. As a result, if a particular rule includes both positive and negative validation rules, and a candidate content item satisfies the primary rule, a positive validation rule and a negative validation rule of the particular rule, the candidate content item is a hit, because it satisfies at least one positive validation rule of the particular rule.

In some other embodiments, negative validation rules have higher priority, or outrank, positive validation rules. As a result, if a particular rule includes both positive and negative validation rules, and a candidate content item satisfies the primary rule, a positive validation rule and a negative validation rule of the particular rule, the candidate content item is not a hit, because it satisfies at least one negative validation rule of the particular rule.

In some embodiments, as shown in FIG. 2 a first report 220 (also 502 in FIG. 5A or 602 in FIG. 6A) is stored in a local database 202 of the respective machine prior to receiving the first query. In some embodiments, the second report 224 in FIG. 2, 520 in FIG. 5B, or 620 in FIG. 6B, is stored in the local database of the respective machine prior to receiving the second query. In some embodiments, the results in first report and second report are computed by a background process, based on the set of rules.

In some embodiments, a respective rule in the set of one or more rules includes executable instructions (e.g., 214 in FIG. 2), or a reference to executable instructions, for determining if content matching the regular expression of the corresponding primary rule satisfies additional criteria required for satisfying the respective rule. In some embodiments, one or more rules in the set of one of more rules includes executable instructions, or a reference (e.g., a link or procedure call) to executable instructions, for determining if content matching the regular expression of the corresponding primary rule satisfies additional criteria required for satisfying the rule. In some embodiments, optionally, the executable code is part of the primary rule and is evaluated as part of evaluation of the primary rule, or alternatively, is evaluated only after all other portions of the rule are evaluated (e.g., including any validation rules present in the respective rule). In one example, the executable instructions determine whether a number (e.g., in the content of a file) is a valid credit card number.

In some embodiments, a respective rule in the set of one or more rules includes one or more actions (e.g., 218 in FIG.

2), or a reference to one or more actions, to be performed if a file or a set of files is determined to satisfy the respective rule. In some embodiments, a respective action is performed as part of evaluation of the respective primary rule. For example, in some embodiments, actions in the one or more actions include assigning a respective user-defined label or predefined state label to a respective file that satisfies a rule (e.g., labeling a respective file as 'sensitive' if the respective file includes a regular expression corresponding to a social security number, credit card number, email address, etc.), sending an alert (e.g., to server 108) reporting that the respective file satisfies a rule (e.g., if the respective file contains information for a particular project), or performing an action on the respective file itself upon satisfaction of a rule (e.g., deleting the respective file from the local database or encrypting the respective file). In some embodiments, a particular action is performed if a respective file fails to satisfy a respective rule (e.g., the respective file is deleted if the respective file does not meet the requirements of the respective rule).

In some embodiments, a respective action is performed only after all portions of the respective rule are evaluated (e.g., including any filters, validation rules and/or executable code present in the respective rule action) with regard to a file or set of files. For instance, an alert may be sent to server 102 to report that a file failed to satisfy a respective validation rule despite satisfying a respective primary rule (e.g., the file contains an email address as required by the respective primary rule; however, the email address is from an unauthorized domain (e.g., gmail.com) and thus fails the respective validation rule). In another example, a file may be encrypted if the file satisfies a respective validation rule in addition to a respective primary rule (e.g., where the file contains a bank routing number—as required by the respective primary rule—and the file further includes information verifying that the file is likely banking information—e.g., the respective validation rule requires that "Routing numbers should be nearby an Account number").

It is noted that the example actions above are actions performed with regard to individual files. However, in some embodiments, a respective action specified as part of the rule definition 206 for a respective rule is applied to a set of files (e.g., each file in a set of files may be encrypted, an alert may be sent to the server with regard to a set of files, and/or a user-defined label or predefined state label may be assigned to each file in a set of files) upon satisfaction of a respective rule. In some embodiments, a respective action specified as part of the rule definition 206 for a respective rule is performed if a set of files fail to satisfy a respective rule (e.g., the set of files are unencrypted if the set of files do not include social security card numbers).

In some embodiments, the external machine sends 1038 a third query to the respective machine, where the third query includes an updated version of at least one rule in the set of one or more rules. In some embodiments, updated rules are treated like new rules, and are evaluated, in the background, against all applicable files as described above for the original set of one or more rules. The respective machine returns 1040 (or 1044) a query response, either in response to the third query (1038) or a subsequent query (e.g., a fourth query 1042), in the form of a first report, second report, and/or third report, each of which is described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first widget could be termed a second widget, and, similarly, a second widget could be termed a first widget, without changing the meaning of the description, so long as all occurrences of the "first widget" are renamed consistently and all occurrences of the "second widget" are renamed consistently. The first widget and the second widget are both widgets, but they are not the same widget.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of monitoring a network comprising a collection of machines that forms a linear communication orbit, the method comprising:
   at a respective machine in the collection of machines:
      receiving, at a first time, a first query through the linear communication orbit, wherein the first query has been propagated from a respective server to the respective machine though one or more upstream machines along the linear communication orbit, and wherein the first query includes a set of one or more rules;
      in response to receiving the first query:
         for each respective rule in the set of one or more rules, identifying files that contain file content that satisfies the respective rule;
      subsequent to receiving the first query:
         generating a first report identifying, for each rule in the set of one or more rules, a count of files at the respective machine that contain file content satisfying the rule;

sending the first report through the linear communication orbit to the respective server via an end machine of the linear communication orbit;

receiving, at a second time subsequent to the first time, from an external machine, external to the linear communication orbit, an instruction packet via the linear communication orbit, wherein the instruction packet has been propagated to the respective machine through the one or more upstream machines along the linear communication orbit, and wherein the instruction packet includes an instruction for establishing a direct duplex connection between the respective machine and the external machine;

in response to receiving the instruction packet through the linear communication orbit, sending an outbound connection request to the external machine to establish the direct duplex connection between the respective machine and the external machine in accordance with a respective network connection protocol; and sending to the external machine, via the direct duplex connection, a second report including file identifying information identifying files at the respective machine that contain file content satisfying each rule in the set of one or more rules.

2. The method of claim 1, including, receiving, at a third time subsequent to the second time, a second query through the direct duplex connection from the external machine, wherein the second query comprises one or more requests for snippets of information from a respective file identified as containing file content satisfying a respective rule in the set of one or more rules; and in response to receiving the second query, sending to the external machine via the duplex direct connection a third report including one or more snippets corresponding to file content in the respective file that contributes to satisfaction of the respective rule.

3. The method of claim 2, wherein the third report includes snippet information identifying, for the respective file, locations in the respective file corresponding to the file content that contributes to satisfaction of the respective rule.

4. The method of claim 1, wherein the direct duplex connection comprises an encrypted communication connection in which information sent by the respective machine to the external machine is encrypted.

5. The method of claim 1, wherein
the first query includes a single rule, the single rule specifying a string, represented by a sequence of hashed tokens, each hashed token corresponding to a predefined unit of text, wherein each of the hashed tokens comprises a result of applying a predefined one-way hash function to a corresponding token; and
the first report includes information corresponding to a count of files at the respective machine that contain file content matching the string specified by the single rule.

6. The method of claim 5, wherein identifying files that contain file content that satisfies the single rule includes performing lookups, in a reverse lookup table, of the hashed tokens in the sequence of hashed tokens, to identify files having content matching units of text in the string specified by the single rule.

7. The method of claim 1, wherein the first report is stored in a local database of the respective machine prior to receiving the first query, and the second report is stored in the local database of the respective machine prior to receiving the second query.

8. The method of claim 1, wherein the external machine is the respective server.

9. The method of claim 1, wherein each rule in the set of one or more rules includes a primary rule, and a respective rule in the set of one or more rules includes one or more validation rules that are logically combined with the primary rule of the respective rule to determine whether respective file content satisfies the respective rule.

10. The method of claim 9, wherein the one or more validation rules of the respective rule include one or more positive validation rules; and
determining whether a respective file satisfies the respective rule comprises determining a number of hits in the respective file, each hit corresponding to file content in the respective file that satisfies both the primary rule of the respective rule and at least one positive validation rule of the respective rule.

11. The method of claim 9, wherein the one or more validation rules of the respective rule include one or more positive validation rules; and
determining whether a respective file satisfies the respective rule comprises determining whether file content within the respective file satisfies at least one positive validation rule in the one or more positive validation rules.

12. The method of claim 9, wherein the one or more validation rules of the respective rule include one or more negative validation rules; and
determining whether a respective file satisfies the respective rule comprises determining a number of hits in the respective file, each hit corresponding to file content in the respective file that satisfies the primary rule of the respective rule and does not satisfy any negative validation rule in the one or more negative validation rules of the respective rule.

13. The method of claim 9, wherein the one or more validation rules of the respective rule include one or more negative validation rules; and
the method includes determining whether a respective file does not satisfy the respective rule, including determining whether file content within the respective file satisfies at least one negative validation rule in the one or more negative validation rules.

14. The method of claim 9, wherein:
the primary rule of each rule in the set of one or more rules corresponds to a respective regular expression.

15. The method of claim 14, wherein a respective rule in the set of one or more rules includes executable instructions, or a reference to executable instructions, for determining if content matching the regular expression of the corresponding primary rule satisfies additional criteria required for satisfying the respective rule.

16. The method of claim 1, including receiving and responding to, via the linear communication orbit, a third query, wherein the third query includes an updated version of at least one rule in the set of one or more rules.

17. A respective machine in a collection of machines that forms a linear communication orbit, the respective machine comprising:
one or more processors; and
memory storing one or more programs that, when executed by the one or more processors, cause the processors to perform operations including:
receiving, at a first time, a first query through the linear communication orbit, wherein the first query has been propagated from a respective server to the respective machine though one or more upstream machines along the linear communication orbit, and wherein the first query includes a set of one or more rules;

in response to receiving the first query:
for each respective rule in the set of one or more rules, identifying files that contain file content that satisfies the respective rule;

subsequent to receiving the first query:
generating a first report identifying, for each rule in the set of one or more rules, a count of files at the respective machine that contain file content satisfying the rule;
sending the first report through the linear communication orbit to the respective server via an end machine of the linear communication orbit;

receiving, at a second time subsequent to the first time, from an external machine, external to the linear communication orbit, an instruction packet via the linear communication orbit, wherein the instruction packet has been propagated to the respective machine through the one or more upstream machines along the linear communication orbit, and wherein the instruction packet includes an instruction for establishing a direct duplex connection between the respective machine and the external machine;

in response to receiving the instruction packet through the linear communication orbit, sending an outbound connection request to the external machine to establish the direct duplex connection between the respective machine and the external machine in accordance with a respective network connection protocol; and sending to the external machine, via the direct duplex connection, a second report including file identifying information identifying files at the respective machine that contain file content satisfying each rule in the set of one or more rules.

18. The respective machine of claim 17, wherein the one or more programs include instructions for:
receiving, at a third time subsequent to the second time, a second query through the direct duplex connection from the external machine, wherein the second query comprises one or more requests for snippets of information from a respective file identified as containing file content satisfying a respective rule in the set of one or more rules; and
in response to receiving the second query, sending to the external machine via the duplex direct connection a third report including one or more snippets corresponding to file content in the respective file that contributes to satisfaction of the respective rule.

19. The respective machine of claim 18, wherein the third report includes snippet information identifying, for the respective file, locations in the respective file corresponding to the file content that contributes to satisfaction of the respective rule.

20. The respective machine of claim 17, wherein the direct duplex connection comprises an encrypted communication connection in which information sent by the respective machine to the external machine is encrypted.

21. The respective machine of claim 17, wherein
the first query includes a single rule, the single rule specifying a string, represented by a sequence of hashed tokens, each hashed token corresponding to a predefined unit of text, wherein each of the hashed tokens comprises a result of applying a predefined one-way hash function to a corresponding token; and the first report includes information corresponding to a count of files at the respective machine that contain file content matching the string specified by the single rule.

22. The respective machine of claim 21, wherein identifying files that contain file content that satisfies the single rule includes performing lookups, in a reverse lookup table, of the hashed tokens in the sequence of hashed tokens, to identify files having content matching units of text in the string specified by the single rule.

23. The respective machine of claim 17, wherein the first report is stored in a local database of the respective machine prior to receiving the first query, and the second report is stored in the local database of the respective machine prior to receiving the second query.

24. The respective machine of claim 17, wherein the external machine is the respective server.

25. The respective machine of claim 17, wherein each rule in the set of one or more rules includes a primary rule, and a respective rule in the set of one or more rules includes one or more validation rules that are logically combined with the primary rule of the respective rule to determine whether respective file content satisfies the respective rule.

26. The respective machine of claim 25, wherein the one or more validation rules of the respective rule include one or more positive validation rules; and
determining whether a respective file satisfies the respective rule comprises determining a number of hits in the respective file, each hit corresponding to file content in the respective file that satisfies both the primary rule of the respective rule and at least one positive validation rule of the respective rule.

27. The respective machine of claim 26, wherein the one or more validation rules of the respective rule include one or more positive validation rules; and
determining whether a respective file satisfies the respective rule comprises determining whether file content within the respective file satisfies at least one positive validation rule in the one or more positive validation rules.

28. The respective machine of claim 26, wherein the one or more validation rules of the respective rule include one or more negative validation rules; and
determining whether a respective file satisfies the respective rule comprises determining a number of hits in the respective file, each hit corresponding to file content in the respective file that satisfies the primary rule of the respective rule and does not satisfy any negative validation rule in the one or more negative validation rules of the respective rule.

29. The respective machine of claim 26, wherein
the one or more validation rules of the respective rule include one or more negative validation rules; and
the one or more programs include instructions for determining whether a respective file does not satisfy the respective rule, including determining whether file content within the respective file satisfies at least one negative validation rule in the one or more negative validation rules.

30. The respective machine of claim 26, wherein:
the primary rule of each rule in the set of one or more rules corresponds to a respective regular expression.

31. The respective machine of claim 30, wherein a respective rule in the set of one or more rules includes executable instructions, or a reference to executable instructions, for determining if content matching the regular expression of the corresponding primary rule satisfies additional criteria required for satisfying the respective rule.

32. The respective machine of claim 26, wherein the one or more programs include instructions for receiving and responding to, via the linear communication orbit, a third query, wherein the third query includes an updated version of at least one rule in the set of one or more rules.

33. A non-transitory computer-readable medium storing instructions that, when executed by one or more processors on a respective machine in a collection of machines that forms a linear communication orbit, cause the respective machine to perform operations comprising:
- receiving, at a first time, a first query through the linear communication orbit, wherein the first query has been propagated from a respective server to the respective machine though one or more upstream machines along the linear communication orbit, and wherein the first query includes a set of one or more rules;
- in response to receiving the first query:
    - for each respective rule in the set of one or more rules, identifying files that contain file content that satisfies the respective rule;
- subsequent to receiving the first query:
    - generating a first report identifying, for each rule in the set of one or more rules, a count of files at the respective machine that contain file content satisfying the rule;
    - sending the first report through the linear communication orbit to the respective server via an end machine of the linear communication orbit;
- receiving, at a second time subsequent to the first time, from an external machine, external to the linear communication orbit, an instruction packet via the linear communication orbit, wherein the instruction packet has been propagated to the respective machine through the one or more upstream machines along the linear communication orbit, and wherein the instruction packet includes an instruction for establishing a direct duplex connection between the respective machine and the external machine;
- in response to receiving the instruction packet through the linear communication orbit, sending an outbound connection request to the external machine to establish the direct duplex connection between the respective machine and the external machine in accordance with a respective network connection protocol; and
- sending to the external machine, via the direct duplex connection, a second report including file identifying information identifying files at the respective machine that contain file content satisfying each rule in the set of one or more rules.

34. The computer-readable medium of claim 33, wherein the one or more programs include instructions for performing operations including:
- receiving, at a third time subsequent to the second time, a second query through the direct duplex connection from the external machine, wherein the second query comprises one or more requests for snippets of information from a respective file identified as containing file content satisfying a respective rule in the set of one or more rules; and
- in response to receiving the second query, sending to the external machine via the duplex direct connection a third report including one or more snippets corresponding to file content in the respective file that contributes to satisfaction of the respective rule.

* * * * *